US012624705B1

(12) United States Patent
Rimmer

(10) Patent No.: US 12,624,705 B1
(45) Date of Patent: May 12, 2026

(54) THRUST BEARING WITH TILTING PAD

(71) Applicant: Halliburton Energy Services, Inc.,
Houston, TX (US)

(72) Inventor: Michael Rimmer, Frimley (GB)

(73) Assignee: Halliburton Energy Services, Inc.,
Houston, TX (US)

( * ) Notice: Subject to any disclaimer, the term of this
patent is extended or adjusted under 35
U.S.C. 154(b) by 0 days.

(21) Appl. No.: 18/947,660

(22) Filed: Nov. 14, 2024

(51) Int. Cl.
| | |
|---|---|
| *F04D 29/041* | (2006.01) |
| *E21B 43/12* | (2006.01) |
| *F04D 13/10* | (2006.01) |
| *F04D 29/047* | (2006.01) |
| *F16C 17/06* | (2006.01) |
| *F16C 32/06* | (2006.01) |

(52) U.S. Cl.
CPC ........ *F04D 29/0413* (2013.01); *E21B 43/128*
(2013.01); *F04D 13/10* (2013.01); *F04D*
*29/047* (2013.01); *F16C 17/06* (2013.01);
*F16C 32/0666* (2013.01); *F16C 2360/00*
(2013.01)

(58) Field of Classification Search
None
See application file for complete search history.

(56) References Cited

U.S. PATENT DOCUMENTS 1,437,788 A * 12/1922 Wadsworth ............. F16C 17/06
384/308
2,744,799 A * 5/1956 Howarth ............... F16C 33/108
384/900

3,132,908 A * 5/1964 Grotzinger .............. F16C 17/06
384/224

(Continued)

FOREIGN PATENT DOCUMENTS

| | | |
|---|---|---|
| CN | 103671546 A | 3/2014 |
| CN | 205136369 U | 4/2016 |

(Continued)

OTHER PUBLICATIONS

Foreign Communication from Related Application—International
Search Report and Written Opinion of the International Searching
Authority, International Application No. PCT/US2024/059727, dated
Aug. 8, 2025, 13 pages.

(Continued)

*Primary Examiner* — Blake Michener
(74) *Attorney, Agent, or Firm* — Conley Rose, P.C.;
Rodney B. Carroll

(57) ABSTRACT

A thrust bearing for an electric submersible pump includes
a housing including an axial surface and an inner circum-
ferential surface. Holes and bores are formed in the axial
surface. The thrust bearing further includes sockets respec-
tively disposed in the holes and pads each including a fluid
interface surface. Two open counterbores are formed in each
of the pads. The inner circumferential surface radially con-
strains the pads. The thrust bearing further includes balls
each engaging one of the sockets and one of the pads and
retaining bolts each including a head and a shaft extending
from the head. Each of the shafts is disposed in one of the
bores. The thrust bearing further includes biasing members
each disposed between a bearing surface of one of the heads
and bottom surfaces of two of the open counterbores. The
pads are able to pivot on the ball.

24 Claims, 21 Drawing Sheets

(56)　　　　　References Cited

U.S. PATENT DOCUMENTS

| | | | | |
|---|---|---|---|---|
| 3,829,180 A * | 8/1974 | Gardner | F16C 33/16 | 384/306 |
| 4,335,925 A * | 6/1982 | Stopp | F16C 17/06 | 384/312 |
| 4,403,873 A * | 9/1983 | Gardner | F16C 17/06 | 384/306 |
| 4,824,263 A * | 4/1989 | Singh | F16C 17/06 | 384/306 |
| 7,780,424 B2 | 8/2010 | Parmeter et al. | | |
| 8,210,747 B2 * | 7/2012 | Cooley | F16C 33/26 | 384/282 |
| 8,764,295 B2 * | 7/2014 | Dadson | E21B 4/003 | 384/282 |
| 10,107,079 B1 | 10/2018 | Frey et al. | | |
| 11,286,985 B2 | 3/2022 | Prevost et al. | | |
| 2008/0115976 A1 | 5/2008 | Ide | | |
| 2012/0020598 A1 | 1/2012 | New et al. | | |
| 2012/0281938 A1 * | 11/2012 | Peterson | E21B 4/003 | 384/306 |
| 2014/0105739 A1 * | 4/2014 | Peterson | F16C 17/028 | 384/306 |
| 2017/0261031 A1 * | 9/2017 | Gonzalez | F16C 33/043 | |
| 2018/0216661 A1 | 8/2018 | Gonzalez | | |
| 2020/0032846 A1 * | 1/2020 | Miess | F16C 33/043 | |

FOREIGN PATENT DOCUMENTS

| | | |
|---|---|---|
| JP | 2023086347 A | 6/2023 |
| WO | 2018041577 A1 | 3/2018 |
| WO | 2022154673 A1 | 7/2022 |

OTHER PUBLICATIONS

Foreign Communication from Related Application—International Search Report and Written Opinion of the International Searching Authority, International Application No. PCT/US2025/011866, dated Aug. 8, 2025, 12 pages.

Filing Receipt, Specification and Drawings for U.S. Appl. No. 18/947,512, entitled "Thrust Bearing With Tilting Pad," filed Nov. 14, 2024, 44 pages.

* cited by examiner

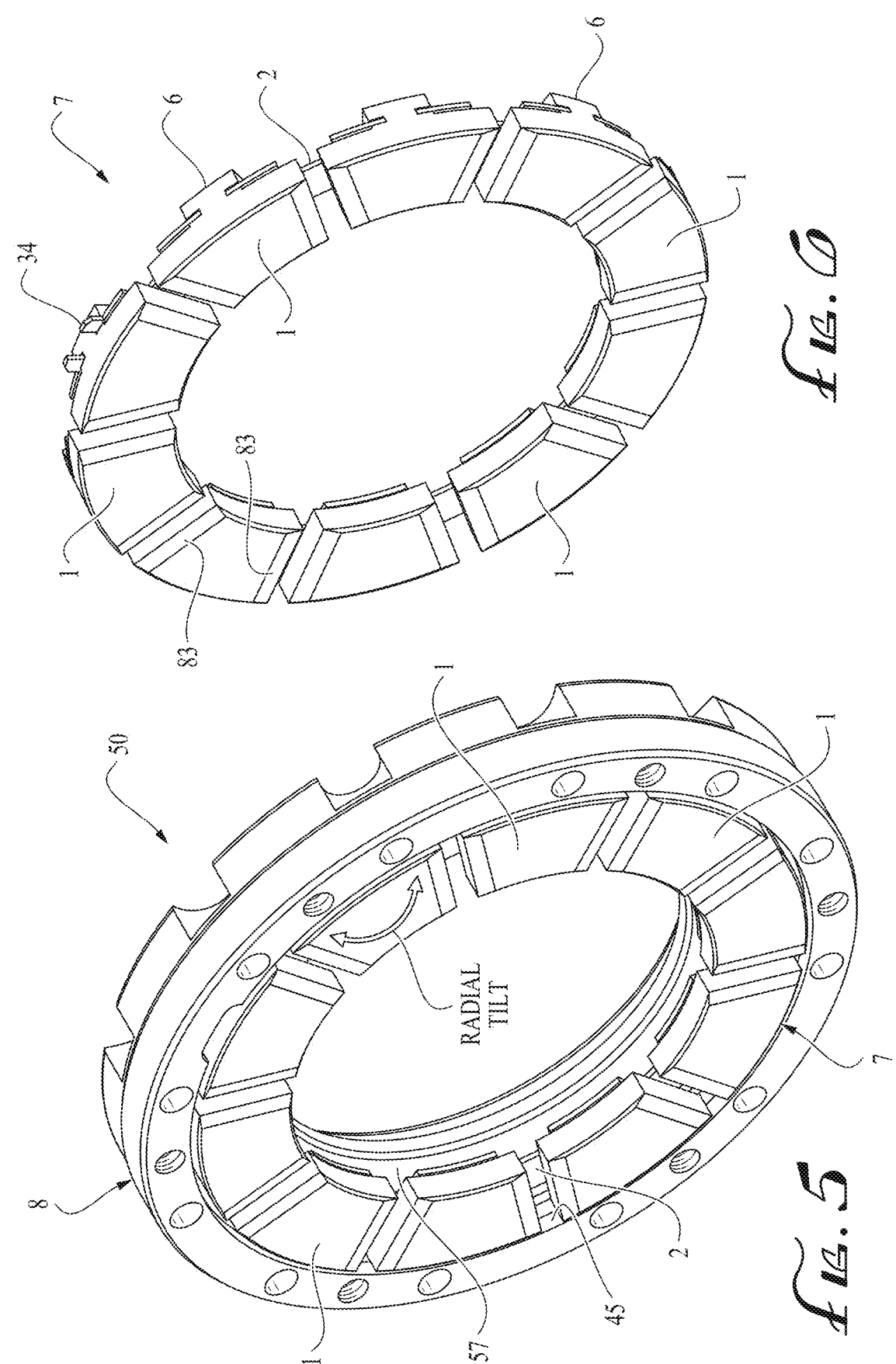
RADIAL
TILT

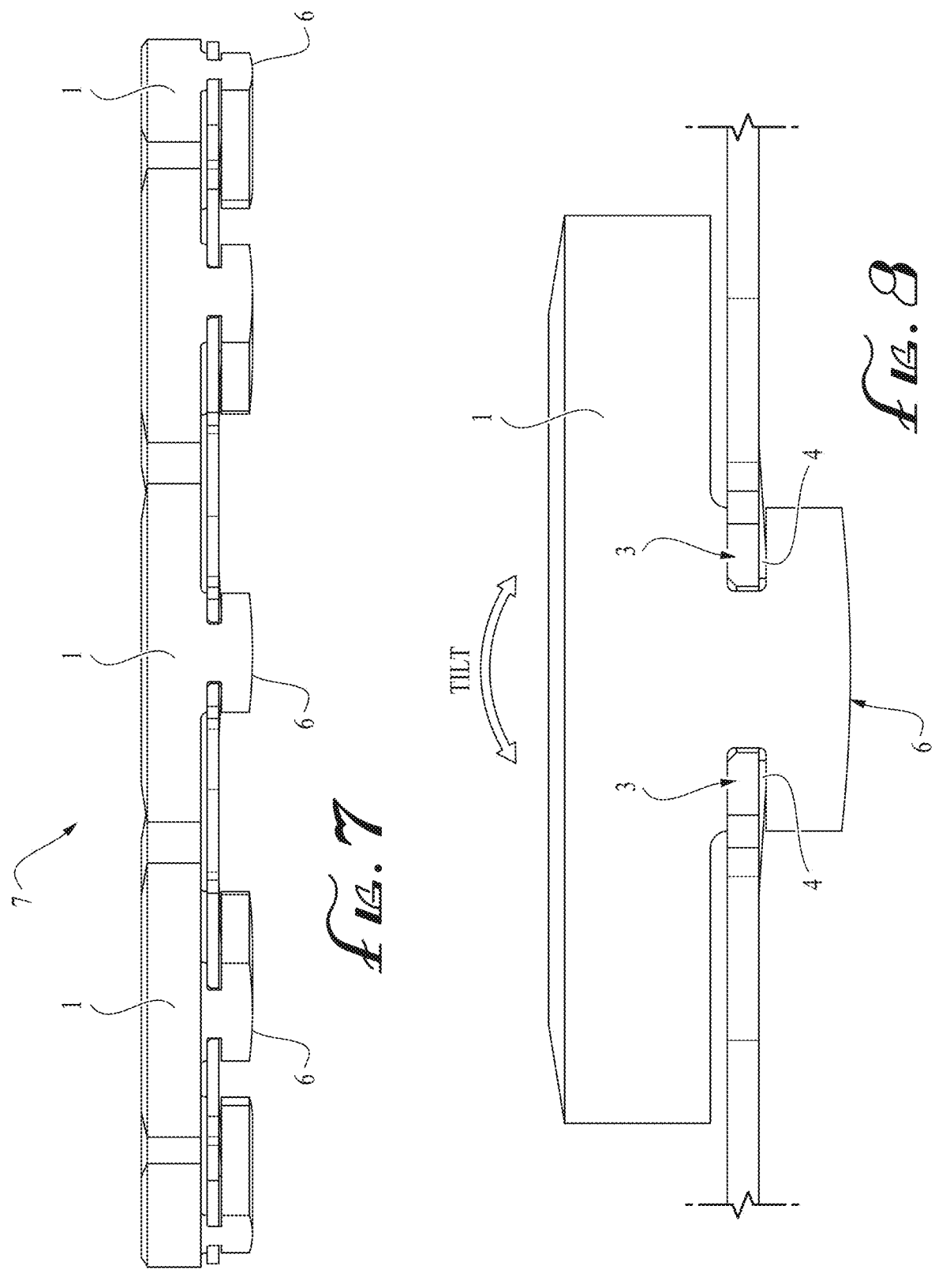

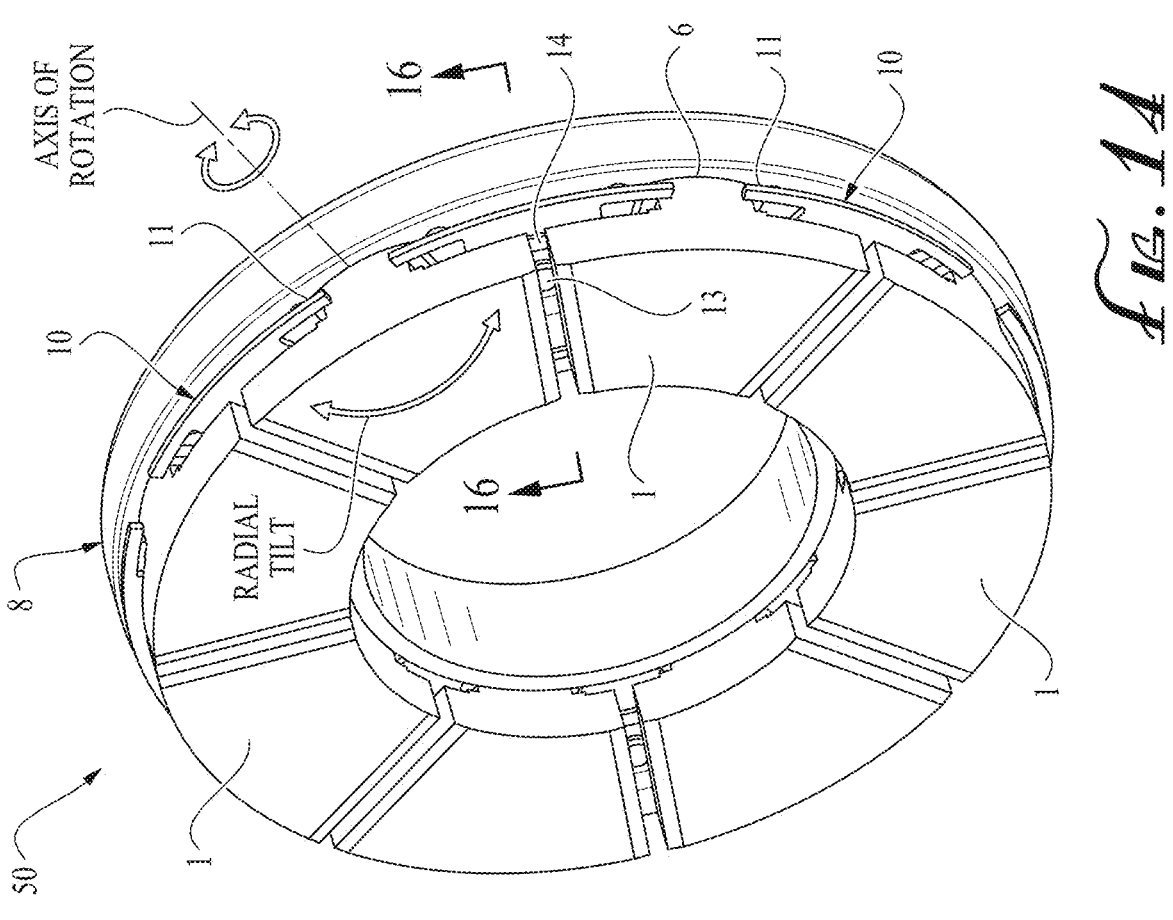
_Fig. 14_
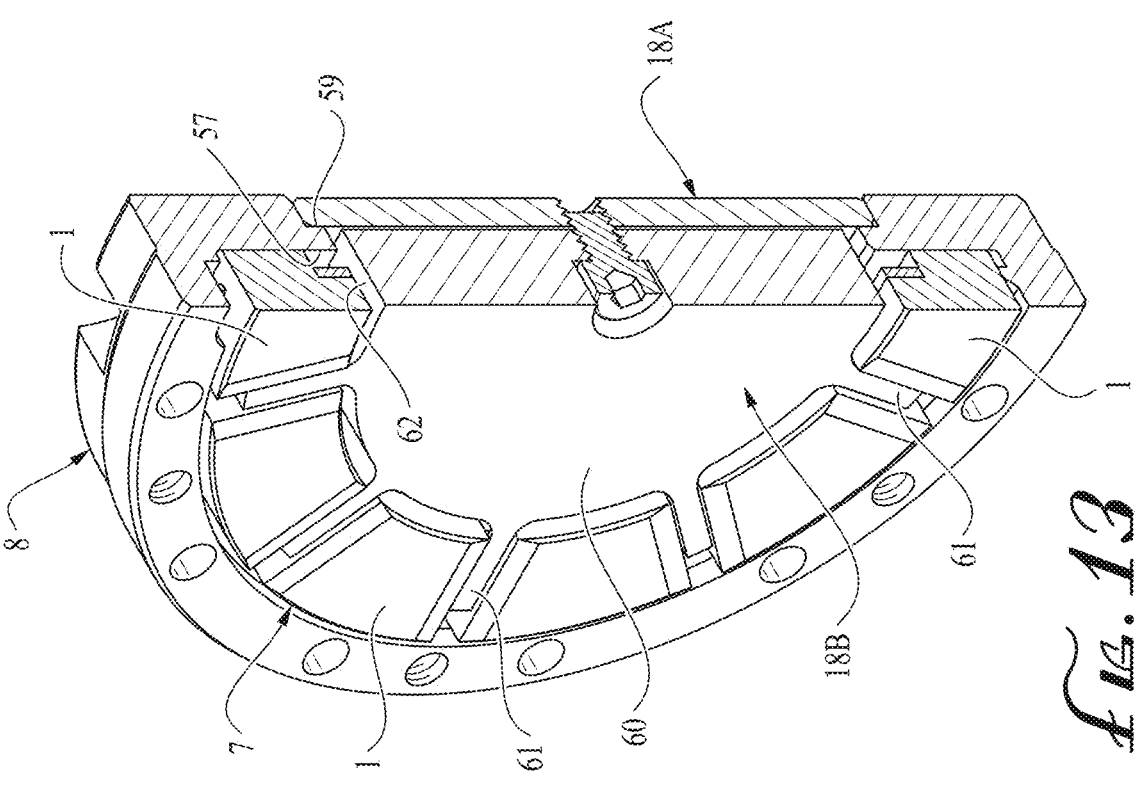
_Fig. 13_

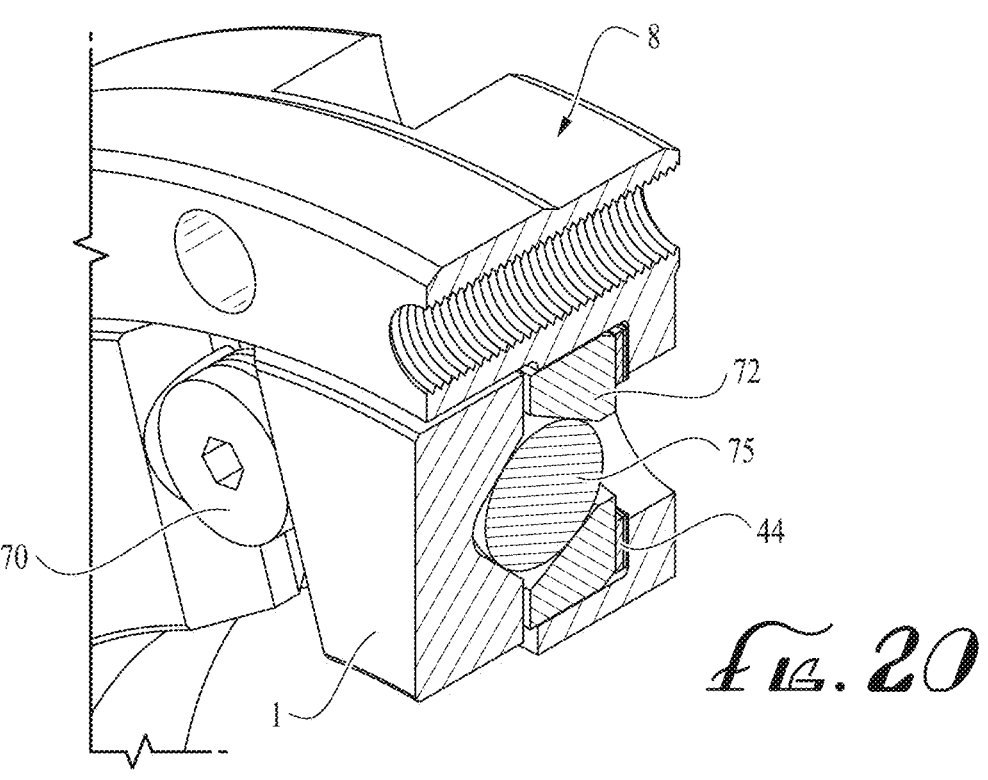
𝓕𝓲𝓰.20
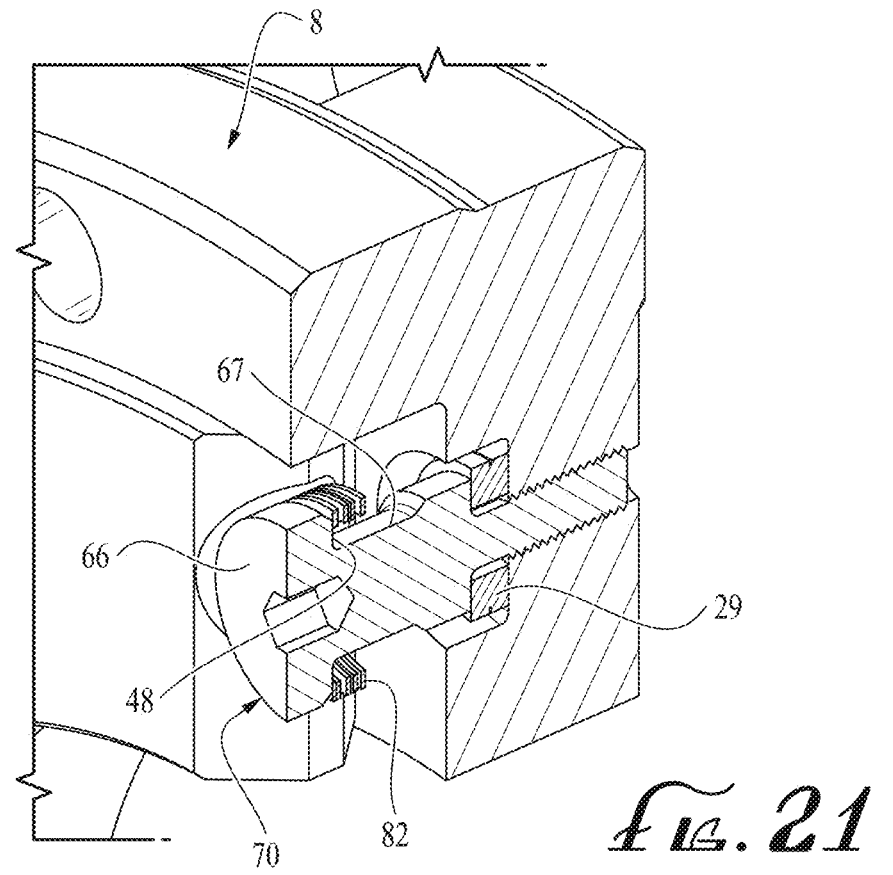
𝓕𝓲𝓰.21

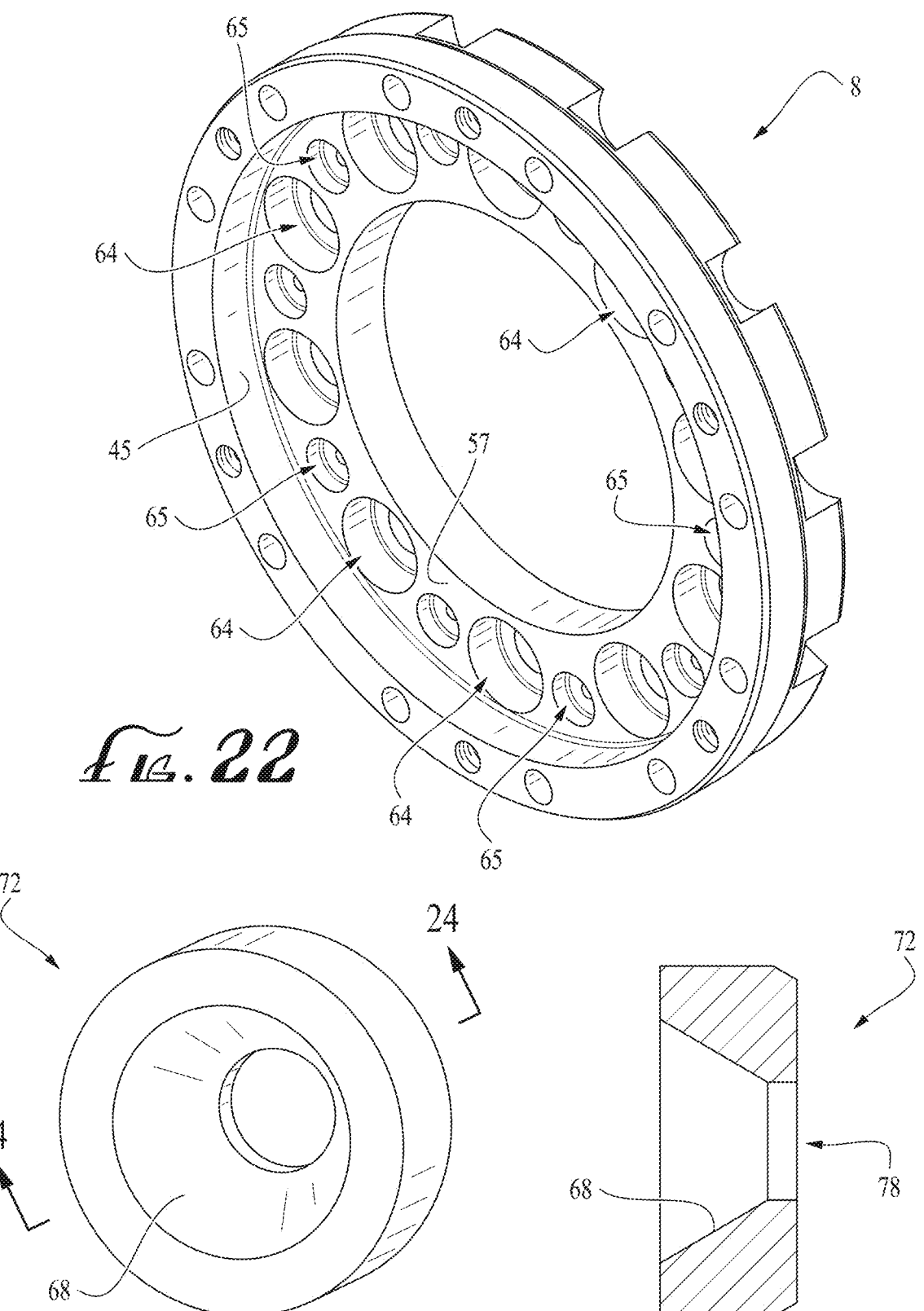
_FIG. 22_
_FIG. 23_           _FIG. 24_

TANGENTIAL
TILT

THRUST BEARING WITH TILTING PAD

BACKGROUND

With high temperature of downhole motors of electric submersible pumps (ESPs), conventional materials such as steel, brass or polymers may become unsuitable for the operating environment at the bearing running/contacting faces. This may be because of material degradation at higher temperatures (e.g., materials start to corrode at an increased rate, the material starts to pit, and/or chemical reactions start to occur and/or the material physically melts). This may also be because of loss of strength (e.g., materials exhibit a rapid loss in mechanical properties, which results in low strengths and subsequent failure of the material). Ceramic materials may be more able to deal with these conditions as the materials are typically insensitive to high temperatures and to chemicals. However, ceramics may also present some manufacturing limitations as the materials are extremely hard, making processing difficult. This can limit the manufacturing methods available, and therefore some designs possible in metals and polymers may no longer be possible in ceramic. Ceramics also pose a secondary issue in that typically, their thermal expansion coefficients are much lower than metals and polymers. Some ceramic bearing solutions fuse bond a layer of ceramic to a metallic substrate and/or join the materials by mechanical means, such as an interference. However, temperature changes may result in thermally induced stresses at the interfaces that may result in cracks to the ceramic and eventual bearing failure. The systems and methods of the present disclosure may address one or more of these issues.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a perspective view of a pad assembly of the thrust bearing, according to an embodiment;

FIG. 6 is a perspective view of the pads and the mounting ring of the pad assembly, according to the embodiment of FIG. 5;

FIG. 7 is a top view of the pads and the mounting ring of the pad assembly, according to the embodiment of FIG. 5;

FIG. 8 is a top enlarged view of a pad and the mounting ring of the pad assembly, according to the embodiment of FIG. 5;

FIG. 13 is a cutaway view of the thrust bearing and the fixtures for assembling the pad assembly, according to the embodiment of FIG. 12;

FIG. 14 is a perspective view of a pad assembly of a thrust bearing, according to another embodiment;

FIG. 20 is a perspective cross-sectional view of the pad assembly of FIG. 19;

FIG. 21 is a perspective cross-sectional view of the pad assembly of FIG. 19;

FIG. 22 is a perspective view of a housing of the pad assembly of FIG. 19;

FIG. 23 is a perspective view of a socket of the pad assembly of FIG. 19;

FIG. 24 is a side cross-sectional view of the socket of the pad assembly of FIG. 19;

DETAILED DESCRIPTION

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

In some embodiments of the present disclosure, a thrust bearing for an ESP comprises tilting pad design that maximizes the load capacity of the bearing. This may be particularly useful at high temperatures as typically the oil used to lubricate the bearing has a significantly reduced viscosity. This can result in the load capacity of the bearing reducing at a rate that is proportional to the viscosity. In some embodiments, methods may be provided to optimize the bearing reaction to the load by having a lead-in to the bearing faces. At lower temperatures, the increased load capacity can be used to allow the use of a lower viscosity oil grade for the motor. Typically, as the downhole equipment are low diameter, they compensate by being very long. As a result, the rotation of the oil inside the motor can create a significant windage loss that may reduce the motor efficiency by significant proportions (e.g. 3%). Lower viscosities may therefore reduce this windage loss and gain some of the motor efficiency back.

Figure 1:
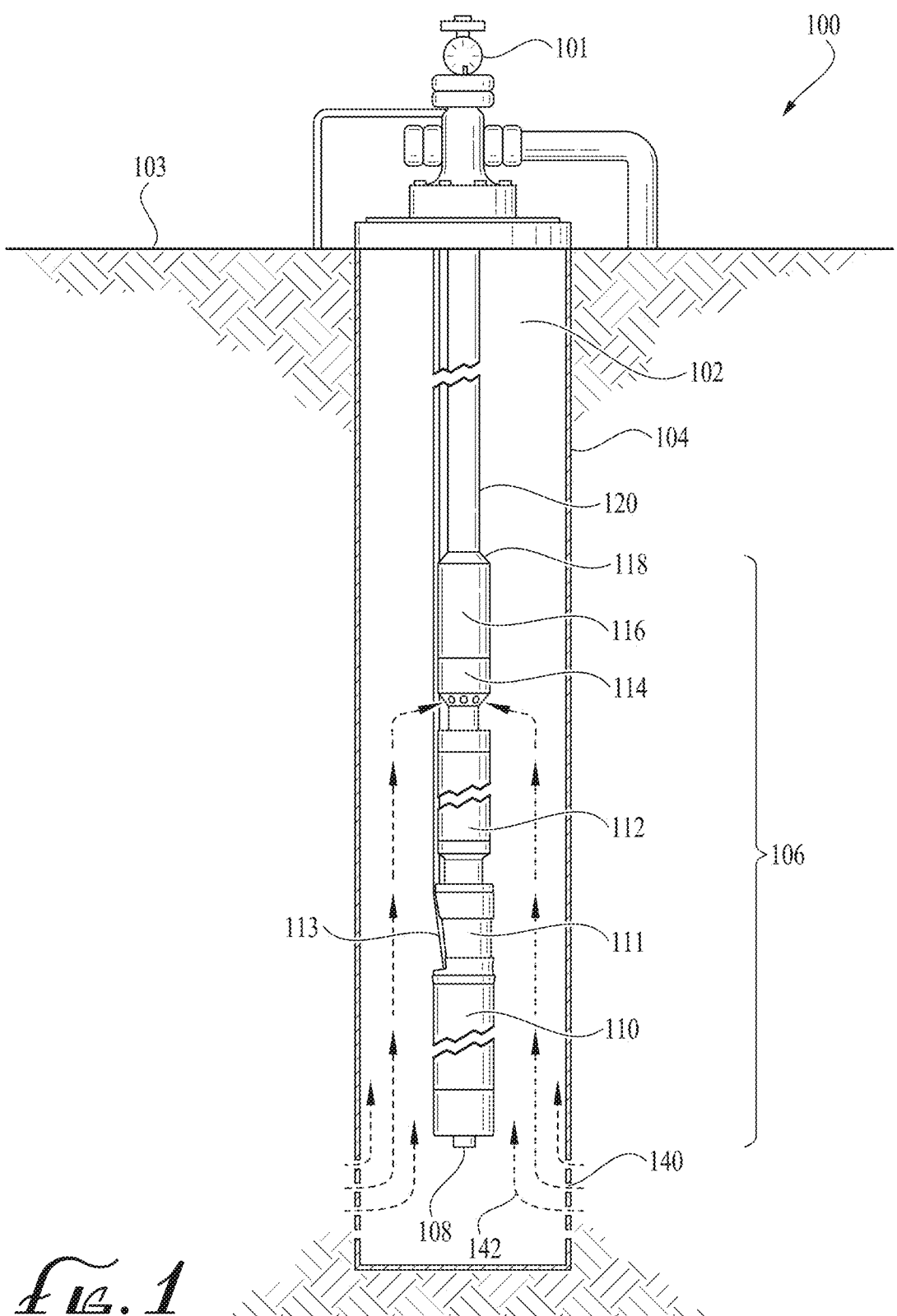
FIG. 1 is a schematic diagram of an ESP, according to an embodiment of the present disclosure.

Referring to FIG. 1, an exemplary producing well environment 100 is described. In an embodiment, the environment 100 comprises a wellhead 101 above a wellbore 102 located at the surface 103. A casing 104 is provided within the wellbore 102.

An exemplary electric submersible pump (ESP) 106 may be deployed downhole in a well within the casing 104 and may comprise an optional sensor unit 108, an electric motor assembly 110 which may include a motor head 111, a seal unit 112, an electric power cable 113, a pump intake 114, a centrifugal pump 116, and a pump outlet 118 that couples the centrifugal pump 116 to a production tubing 120. The centrifugal pump 116 may be operatively coupled to the motor assembly 110 by a shaft. In an embodiment, the ESP 106 may employ radial and thrust bearings in several places, for example in the electric motor assembly 110, in the seal unit 112, and/or in the centrifugal pump 116. In an embodiment, the ESP 106 can comprise a gas separator that may employ one or more radial or thrust bearings. The motor head 111 may couple the electric motor assembly 110 to the seal unit 112. The electric power cable 113 may connect to a source of electric power at the surface 103 and to the electric motor assembly 110, for example being configured to provide power from the source of electric power at the surface 103 to the electric motor assembly 110.

In operation, the casing 104 may be pierced by perforations 140, and reservoir fluid 142 may flow through the perforations 140 into the wellbore 102. The fluid 142 may flow downstream in an annulus formed between the casing 104 and the ESP 106, may be drawn into the pump intake 114, may be pumped by the centrifugal pump 116, and may be lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (such as a rod pump, a progressive cavity pump, any other type of pump suitable for the system, or combinations thereof) may be used instead.

Figure 2:
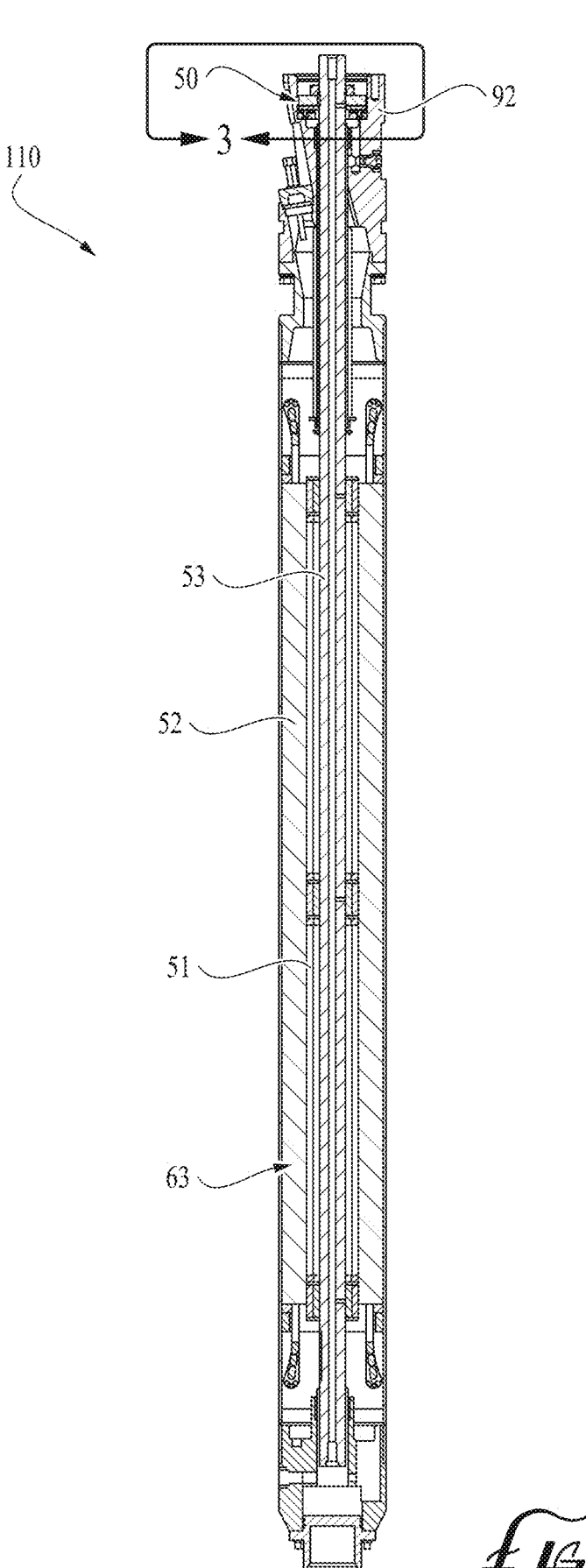
FIG. 2 is a cross-sectional side view of a motor of an ESP, according to an embodiment.

Referring to FIG. 2, an exemplary motor assembly 110 is shown. The motor assembly 110 may comprise a rotor 51, a stator 52, a shaft 53, a thrust bearing 50, and an integral housing 92. The integral housing 92 may surround components of the thrust bearing 50 and the overall motor assembly 110. The rotor 51 may be affixed to the shaft 53 and may be configured to rotate inside the stator 52. The thrust bearing 50 may allow rotation of the shaft 53 with respect to the integral housing 92. It is contemplated that the thrust bearing 50 of the present disclosure could additionally or alternatively be used at other locations within the ESP.

Figure 3:
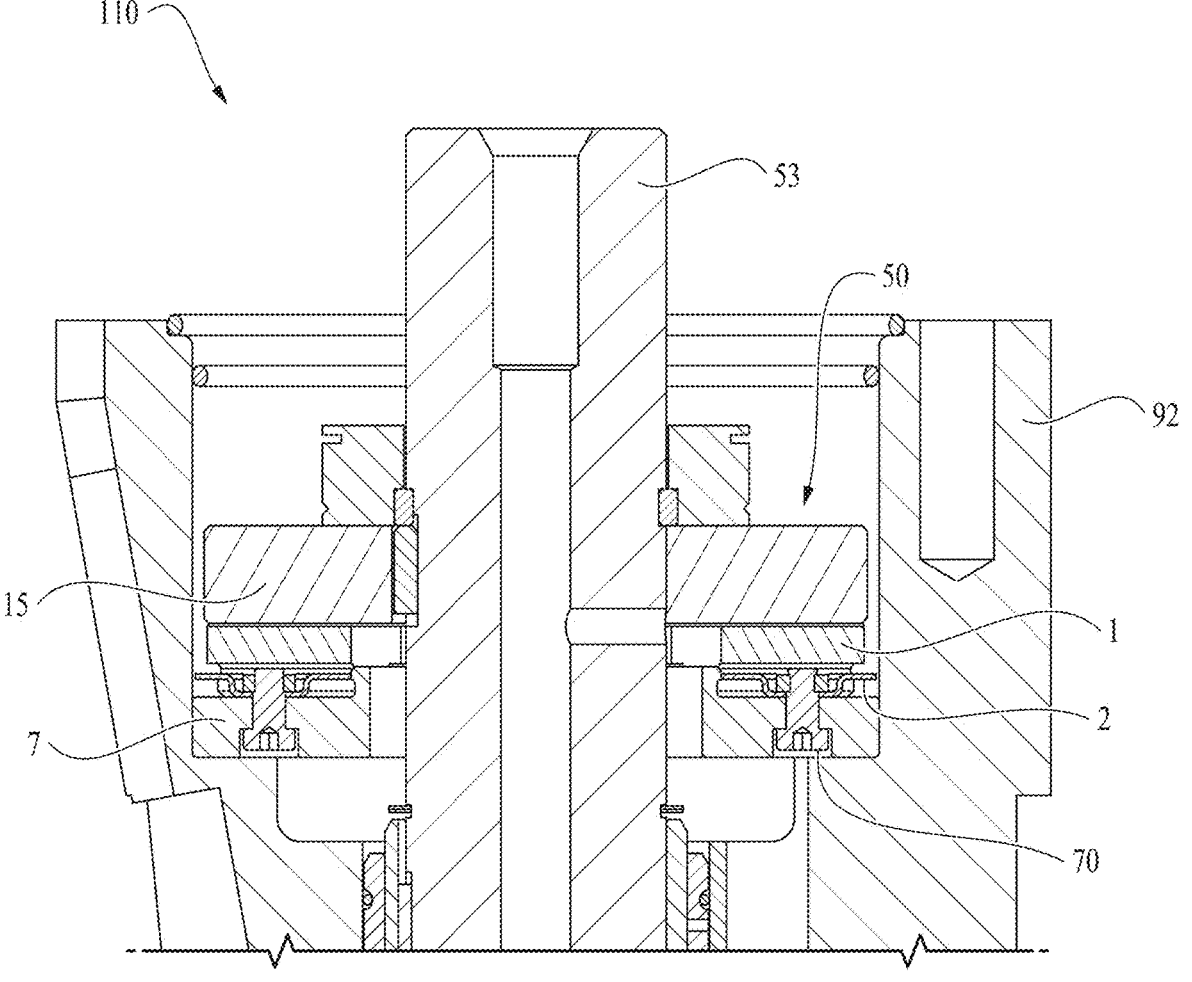
FIG. 3 is a cross-sectional side view of a thrust bearing in a motor, according to an embodiment.

Referring to FIG. 3, the thrust bearing 50 may include a pad assembly 7 and a thrust runner 15. The thrust runner 15 may be affixed (e.g., keyed) to the shaft 53. The thrust runner 15 may be configured to rotate with respect to the pad assembly 7, which may be enclosed by and/or affixed to the integral housing 92. A fluid film may be formed between the thrust runner 15 and the pad assembly 7 to reduce friction between these components when the thrust runner 15 is spinning. The pad assembly 7 may be configured to support the weight of the shaft 53. There may be a spring element that lightly biases the thrust runner 15 against the pad assembly 7. Although in the embodiment of FIG. 3 one pad assembly is shown, in some embodiments, there is a pad assembly on either side of the thrust runner 15.

Figure 4:
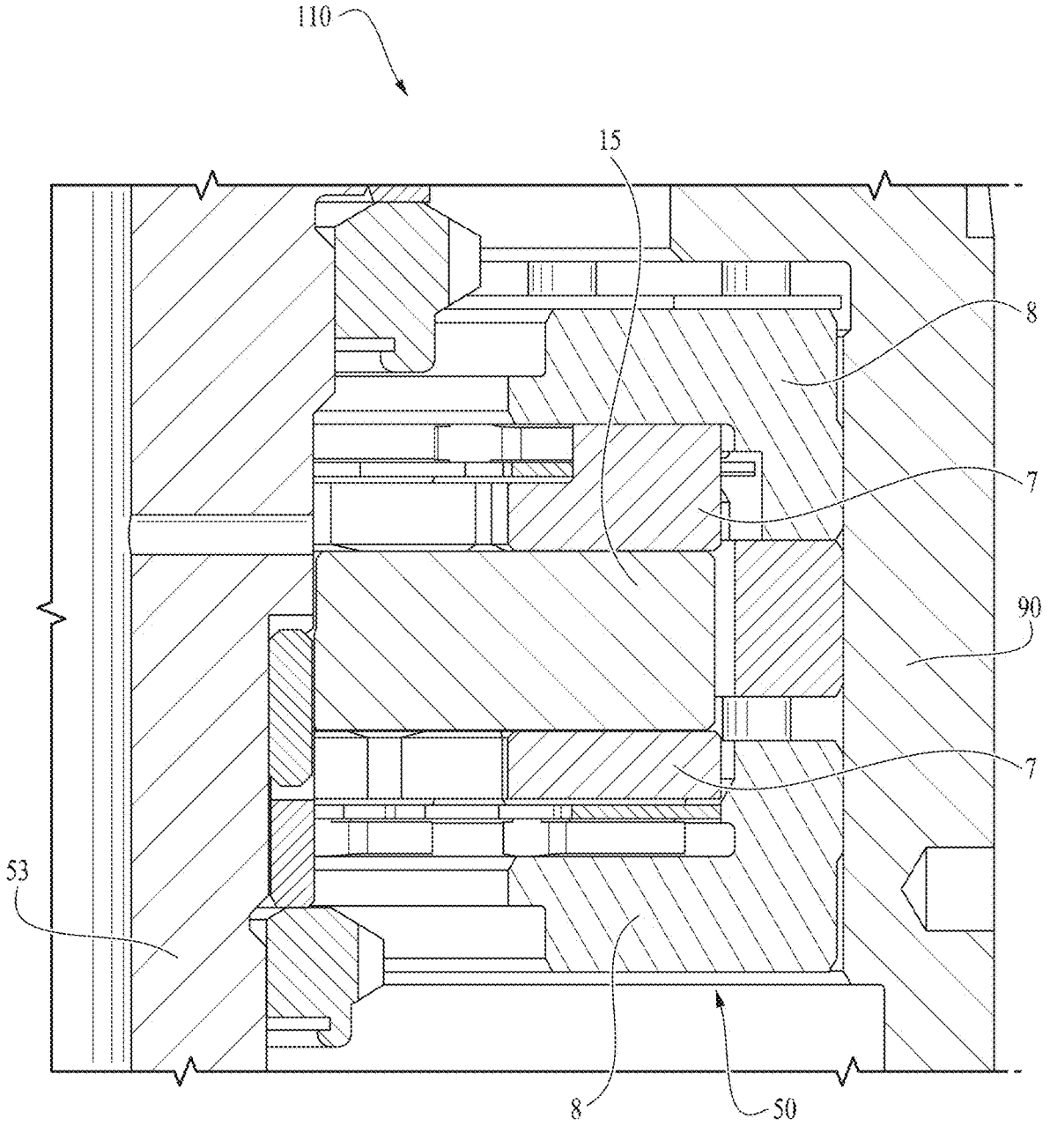
FIG. 4 is a cross-sectional side view of a thrust bearing in a motor, according another embodiment.
Figures 9, 10:
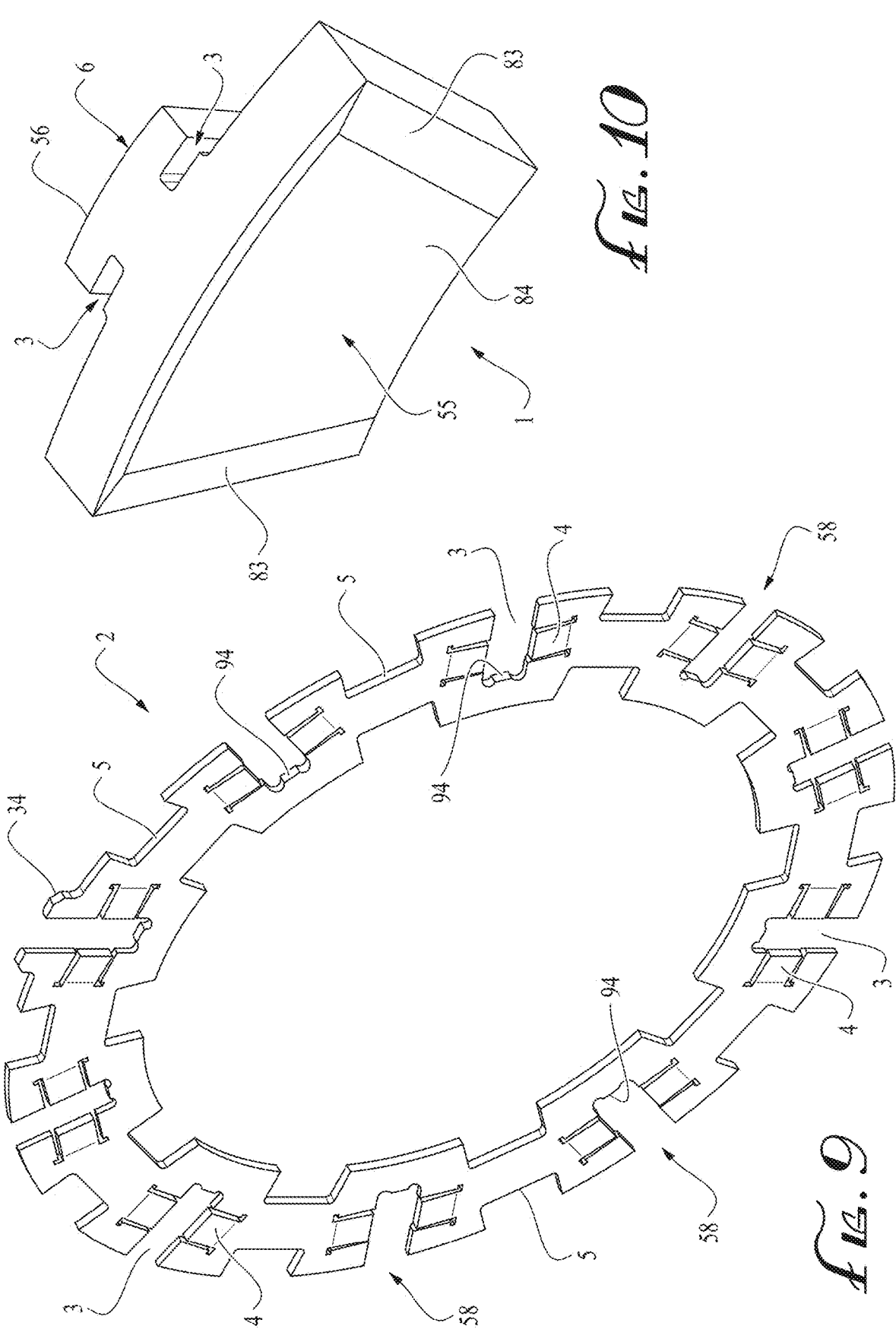
FIG. 9 is a perspective view of the mounting ring of the pad assembly, according to the embodiment of FIG. 5.
FIG. 10 is a perspective view of a pad of the pad assembly, according to the embodiment of FIG. 5.
Figure 11:
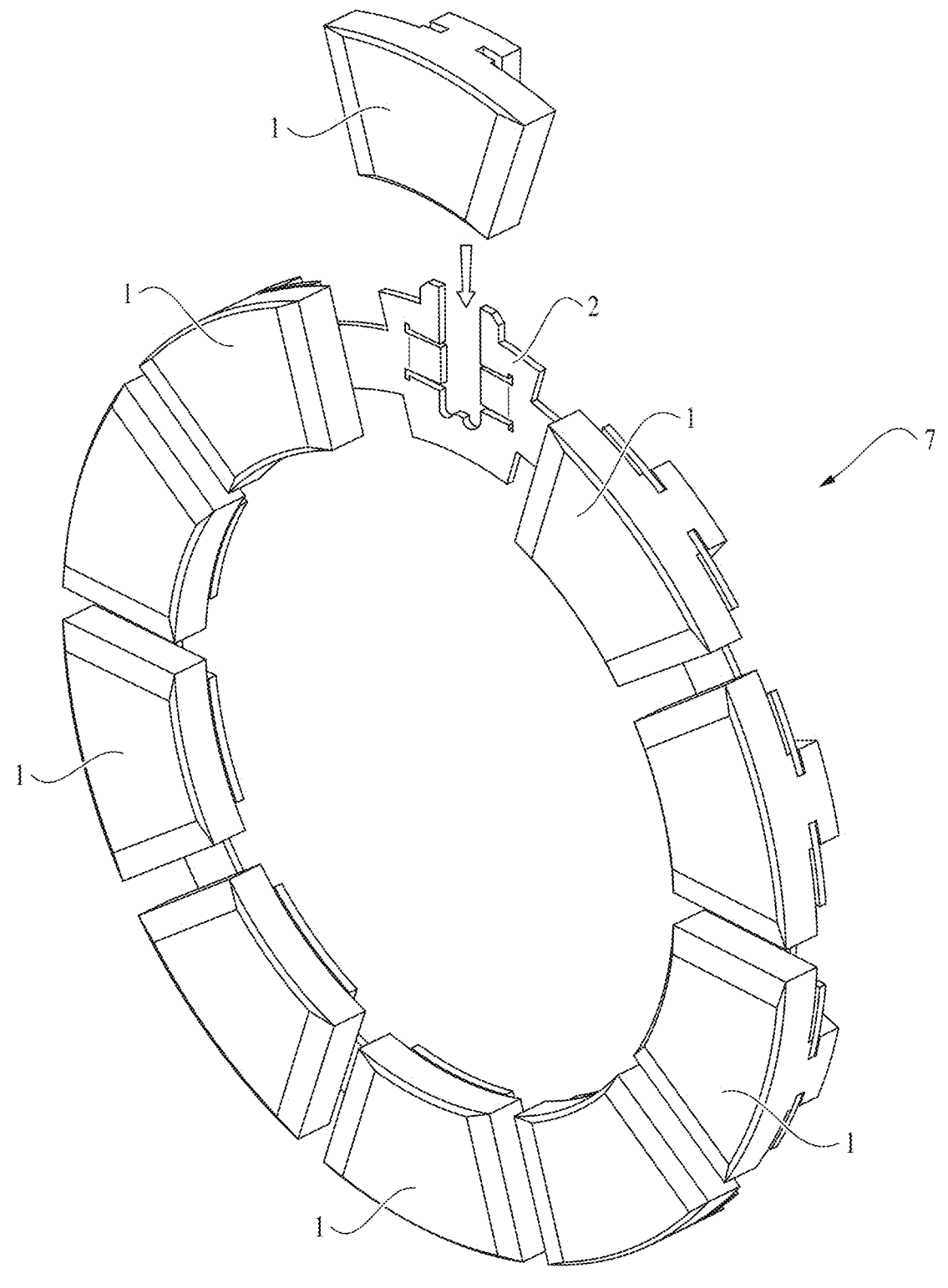
FIG. 11 is a perspective view of the pad assembly illustrating the insertion of the pad, according to the embodiment of FIG. 5.

Referring to FIG. 4, the thrust bearing 50 according to an embodiment may include a thrust runner 15 and pad assemblies 7. In the embodiment of FIG. 4, there are two pad assemblies 7, one on either side of the thrust runner 15. There may be a bearing housing 8 at least partially surrounding the thrust runner 15 and the pad assembly 7. The thrust runner 15 may be keyed to the shaft 53. A motor housing 90 may enclose the shaft 53 and the thrust bearing 50.

In some embodiments, an integral housing 92 (see FIGS. 2-3) can perform the function of both the bearing housing 8 and the motor housing 90 (see FIG. 4). That is, the integral housing 92 may enclose components of the thrust bearing 50 and the overall motor assembly 110.

In some embodiments, a tilting pad design is provided which maximizes load capacity at high temperatures where the oil viscosity is low. The tilting mechanism can be configured to allow operation of the bearing using a cage mounted design. The bearing can be bi-directional while allowing a central pivot point and maintaining its load capacity. In some embodiments, a cage mounted ceramic bearing pad is used. In some embodiments, a spring element to retain pads in a cage is provided. In some embodiments, a fixture is provided for lapping during the manufacturing process to ensure the pads are flat and even.

In some embodiments, the bearing pads may be mounted in a steel cage. This steel cage may be a continuous ring or made of individual elements that hold one or more bearing pads in position. The use of individual elements may be preferable when the bearing are very small.

Referring to FIGS. 6, 8, and 9-11, a cage mounted pad assembly 7 may include a continuous mounting ring 2. A set of pads 1 may be located in the mounting ring 2. The pads 1 may be made from a ceramic, e.g., tungsten carbide, zirconia, alumina or similar. The mounting ring 2 may be a metallic sheet material, e.g. steel, spring steel, stainless steel, nitronic, inconel, etc. This may allow it to be punched, laser or water jet cut and formed using a forming tool, although other manufacturing methods may be equally useable. The mounting ring 2 may be formed in such a way to allow the pads 1 to slide into the mounting ring 2. Owing to the wedge shape of the pads 1, the disclosed design may do this from the outer diameter side, pushing the pads 1 inward. However, this could alternatively be from the inside outward, from the top inward or from the bottom upward depending on selected cage design.

The pads 1 and mounting ring 2 may be designed with a corresponding pad slot 3 that allows the pads 1 to be retained in the mounting ring 2 (e.g., in the axial and radially inward directions). It could however be in an alternative direction. In order to retain the pads 1 into the mounting ring 2, a spring element 4 can be made into the mounting ring 2. This may be designed to apply a small load which retains the pads 1. As the spring element 4 can deflect, it does not overly restrict the pads' 1 ability to tilt. The design of the spring element 4 may also allow for assembly of the pads 1, and therefore, an excessively high load may be avoided.

To enable the pads 1 to tilt, the bottom of the pad 1 may include a pivot 6 (e.g., a curved surface). For ease of manufacture, the curve can be limited to allow tilting in the circumferential direction by using a cylindrical surface, with the axis of the curved surface lying in the radial direction of the thrust bearing 50. In other embodiments, the pivot 6 could be manufactured as a spherical surface, which may allow a tilt in two directions (e.g., radial tilt and tangential tilt). The axis of the cylinder or contact point of the sphere is may be positioned so that the center of force pass through it. However, other locations may be selected depending on the required bearing operating characteristic. In other embodiments, a fixed pad design could be implemented by using a flat surface so that no pivot is created.

In order to further enhance the ability of the pads 1 to tilt, the mounting ring's 2 dimensions can be reduced at locations away from the pads 1 (e.g. stiffness tuning feature 5). That is, a thickness of the stiffness tuning feature 5 may be different than the thickness of the spring element 4. By carefully tuning (e.g., setting the thickness of) the various dimensions of the slots 3 of the mounting ring 2, a desired stiffness can be achieved (e.g., a stiffness that corresponds to the force required to allow and/or resist tilting of the pads 1 to an appropriate degree to facilitate a fluid film which causes a repulsive force between the thrust runner 15 and the pad assembly 7).

Any number of pads 1 is within the scope of the present disclosure. The pads 1 may be located into the mounting ring 2 to form a pad assembly 7. The number of pads 1 may be selected based on the available space for the bearing, manufacturing practicalities (e.g. to limit number of parts) and for optimizing load capacity. For example, there may be three, four, five, six, seven, eight, nine, ten, eleven, twelve, or more pads 1.

In some embodiments, the spring element 4 may typically not apply sufficient load to fully prevent the pads 1 from sliding out from the mounting ring 2. This may occur in the opposite sense to how they were assembled, e.g., if assembled from outside inward, they may come out by moving outward. To prevent this, the pad assembly 7 can be assembled into a bearing housing 8 as shown in FIG. 5. A reasonably close-fitting diameter may locate the pad assembly 7 in the housing 8 in the radial direction and also prevent the pads 1 from coming out of the mounting ring 2.

The bearing housing 8 may also act as the opposing face on which the pivot 6 of the pads 1 act. In this way, the thrust load from the thrust bearing 50 may be transmitted from the bearing face (e.g., a rotating thrust runner 15 connected to the shaft 53 as shown in FIG. 4), through the pads 1, through the pivot 6 into the bearing housing 8. Although the bearing housing 8 is shown as one body, it may be constructed from separate parts depending on the application. In other embodiments, where there is adequate space or where there is a need to do so, the mounting ring 2 may have features added to it to allow it to be mechanically held (e.g. by a bolt, pin, circlip or welding), to the bearing housing 8. An anti-rotation feature 34 can also be added (see FIG. 9).

Figure 12:
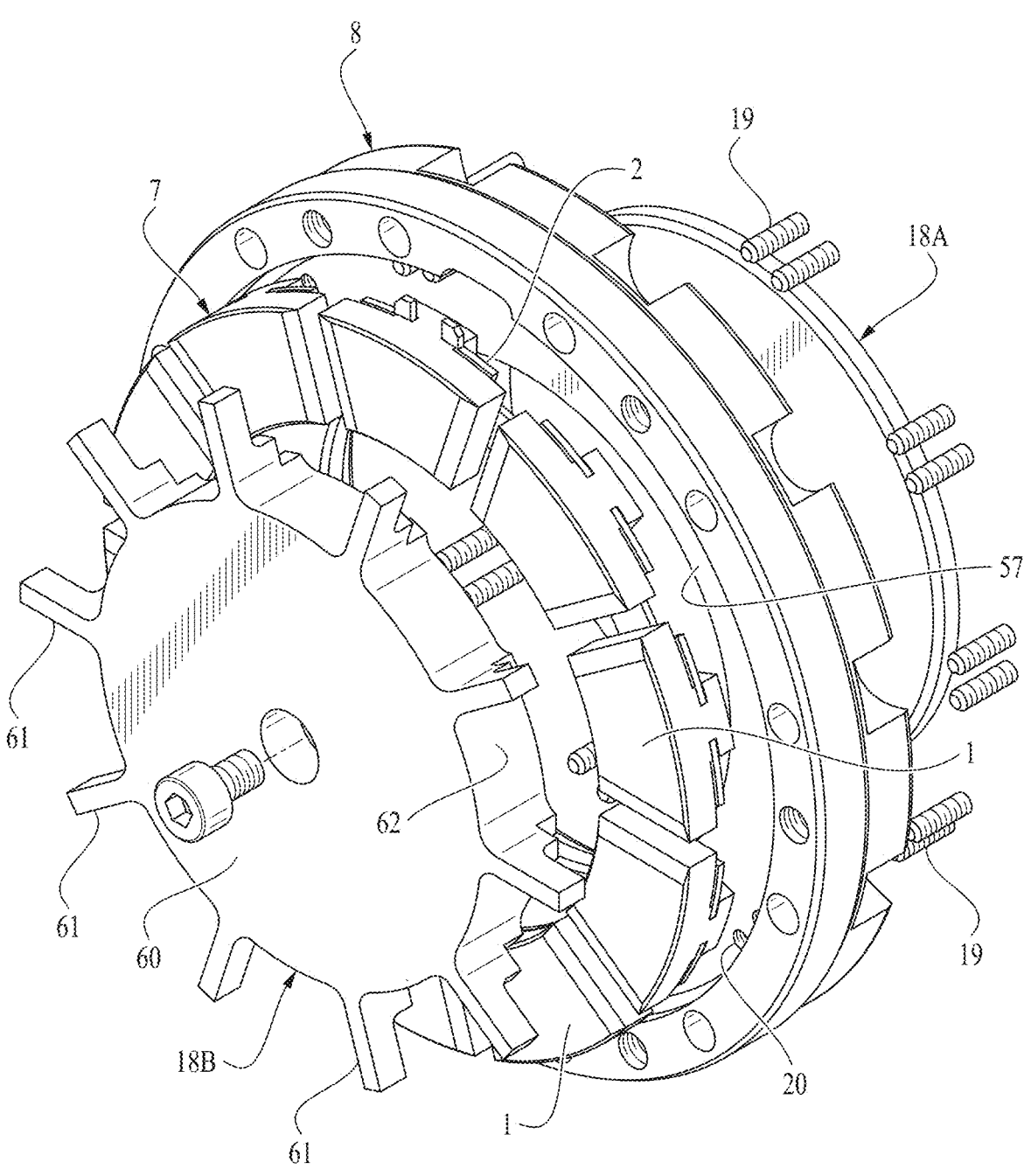
FIG. 12 is an exploded view of the thrust bearing and fixtures for assembling the pad assembly, according to an embodiment.
Figures 15, 16:
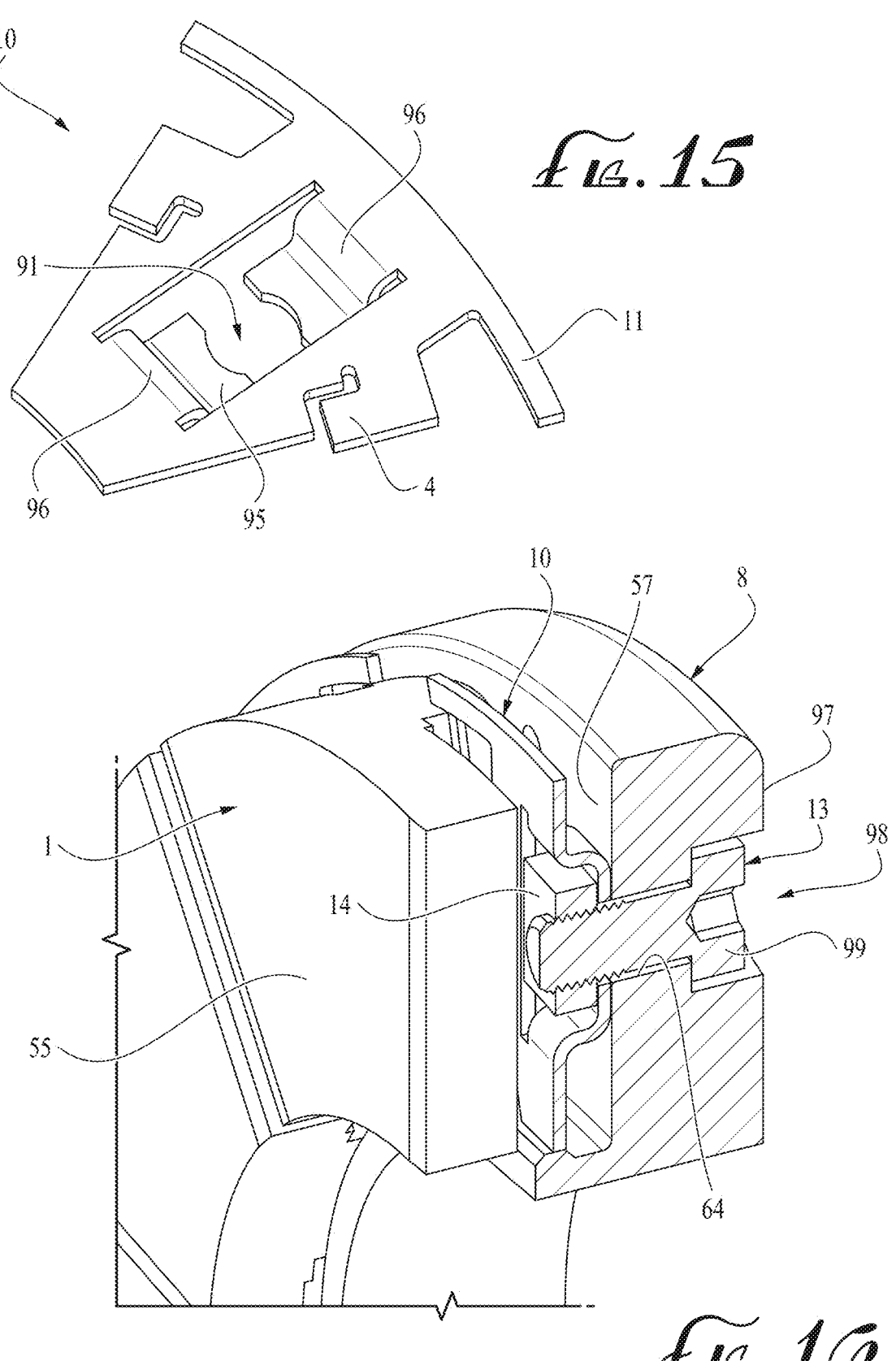
FIG. 15 is a perspective view of a mounting clip of the pad assembly, according to the embodiment of FIG. 14.
FIG. 16 is a perspective cross-sectional view of the pad assembly of FIG. 14.
Figure 17:
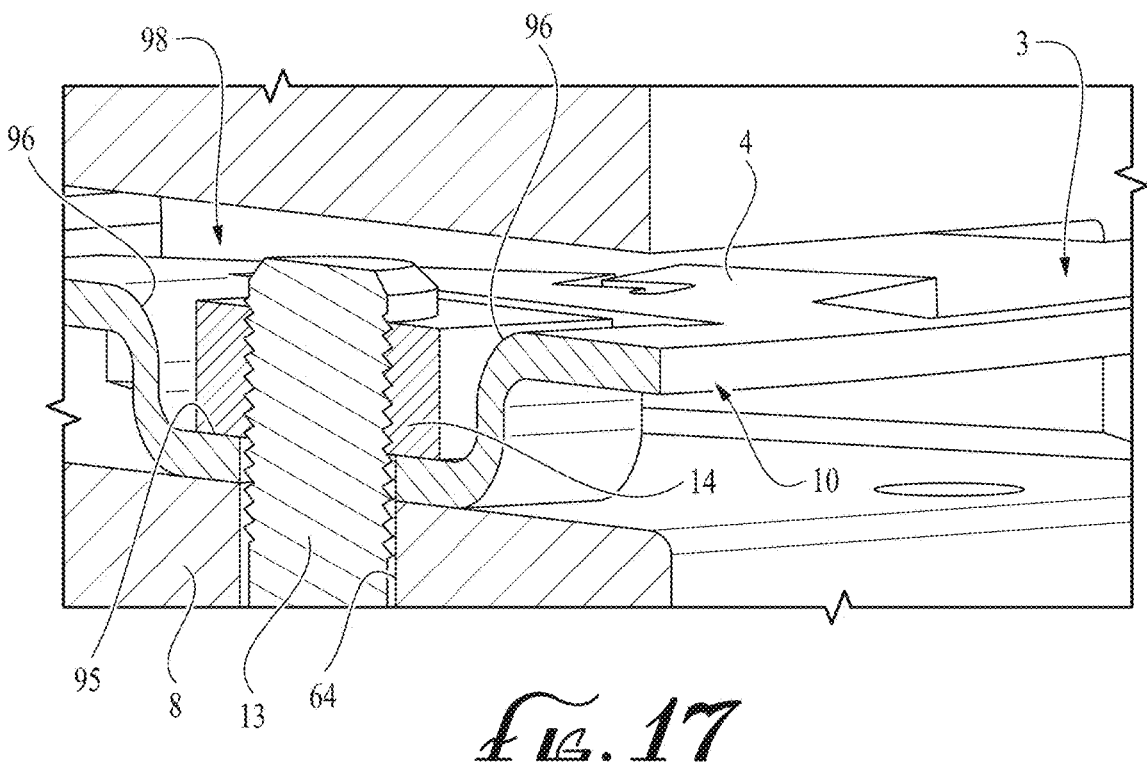
FIG. 17 is a cutaway perspective view of the pad assembly of FIG. 14.
Figure 18:
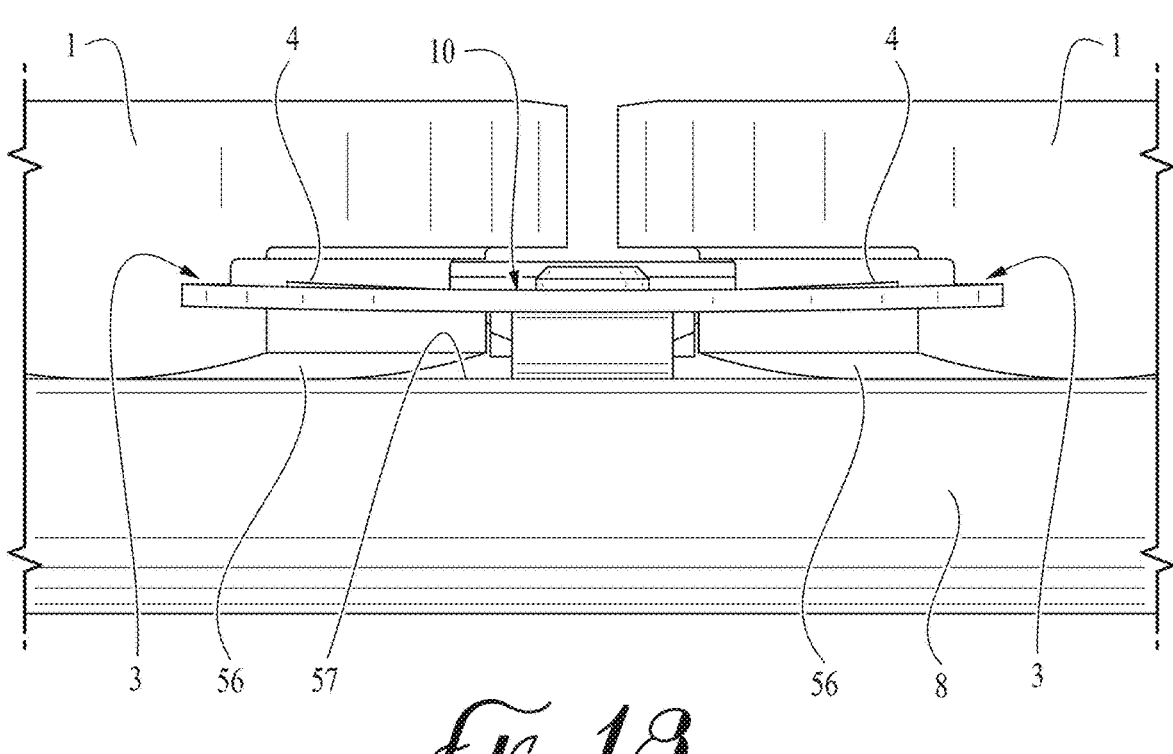
FIG. 18 is a cross-sectional side view of the pad assembly of FIG. 14.

In some embodiments, the face of the thrust bearing is tightly controlled. For example, all pad 1 faces may lie in the same plane and this plane may be flat and parallel to the thrust runner 15. This can be achieved by fluid interface surfaces 55 of the pads 1 of the pad assembly 7. Pad edge features 83 may also be added at this manufacturing stage. To facilitate these operations, the pads 1 may be prevented from tilting. In embodiments where the pad assembly 7 is not mechanically held to the bearing housing 8, the pad assembly 7 can be held to the bearing housing 8 using fixtures 18A, 18B (see FIGS. 12 & 13). To further prevent pad tilt and to also ensure the pads 1 are rigidly held, a set of screws 19 can be put through holes 20 in the bearing housing 8. The screws 19 may press on the underside of the pads 1 on either side of the pivot 6. In combination with the fixtures 18A, 18B, this may ensure that the pads 1 are rigid. Once lapping is complete, the fixtures 18A,18B and screws 19 may be removed to allow the pads 1 to tilt.

Figure 30:
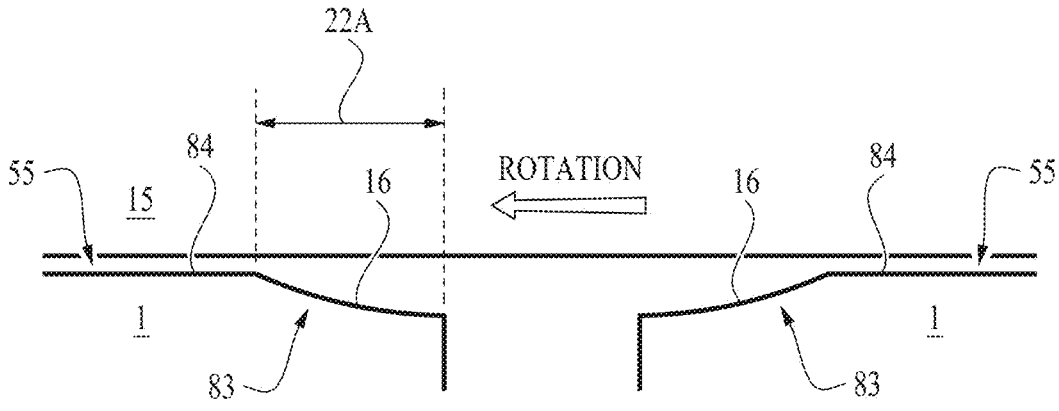
FIG. 30 is a schematic diagram of the fluid interface surface of the pad, according to an embodiment.
Figure 31:
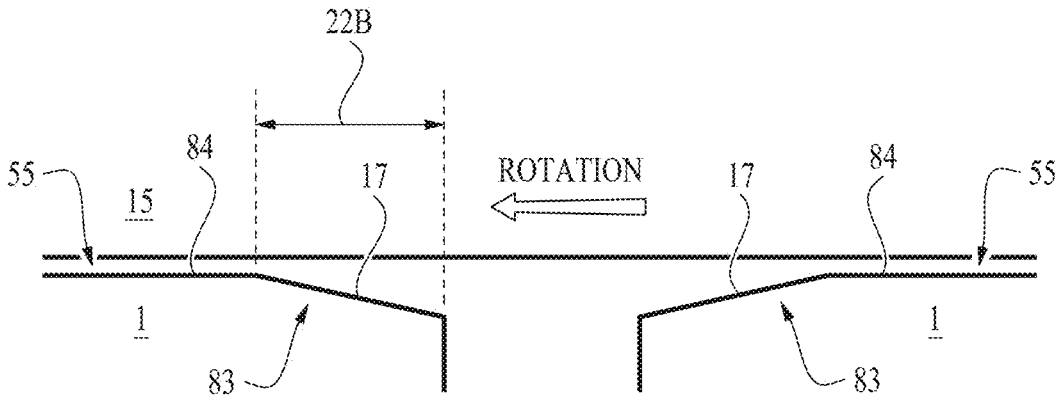
FIG. 31 is a schematic diagram of the fluid interface surface of the pad, according to another embodiment.
Figure 32:
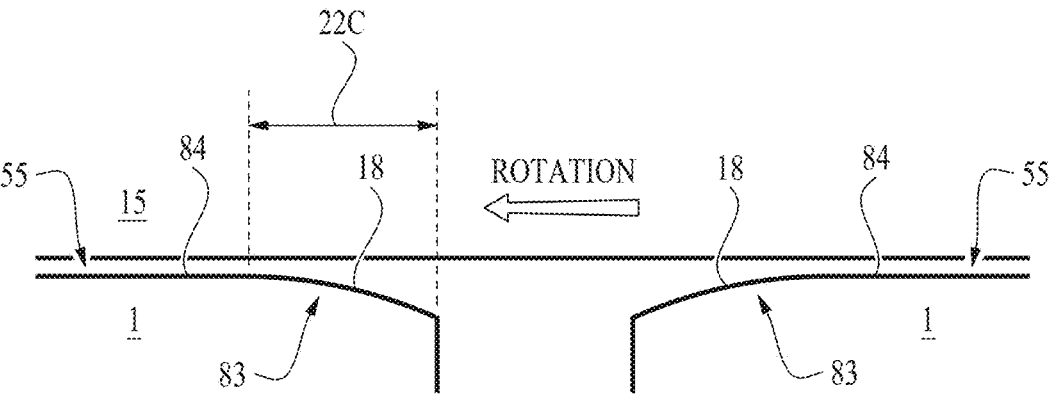
FIG. 32 is a schematic diagram of the fluid interface surface of the pad, according to yet another embodiment.

The edge feature 83 may be a scallop, a chamfer, a fillet radius, or any other suitable form as shown in FIGS. 30-32. This may create an oil wedge leading into the pads 1 which may start to generate pressure as the oil is forced into the converging gap by the rotation of the thrust runner 15. The scallop 16 shown in FIG. 30 may have a length 22A of 0.5 to 10 mm and be manufactured by a large radius cutter of typically 5 mm to 400 mm, with a small depth of cut of 0.025 mm to 0.2 mm. The chamfer 17 shown in FIG. 31 may have a length 22B of 0.5 to 10 mm, with a small angle 23 typically of between 0.5° to 10°. The fillet radius 20 shown in FIG. 32 may have a large radius of typically 5 mm to 400 mm, with a length 22C of 0.5 to 10 mm.

Figure 33:
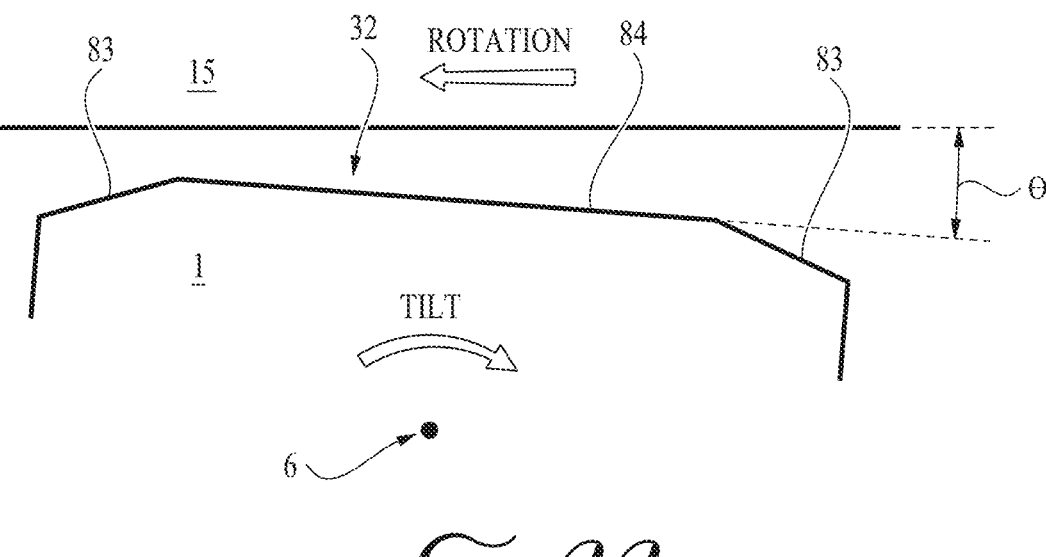
FIG. 33 is a schematic diagram of the pad tilt, according to an embodiment.
Figure 34:
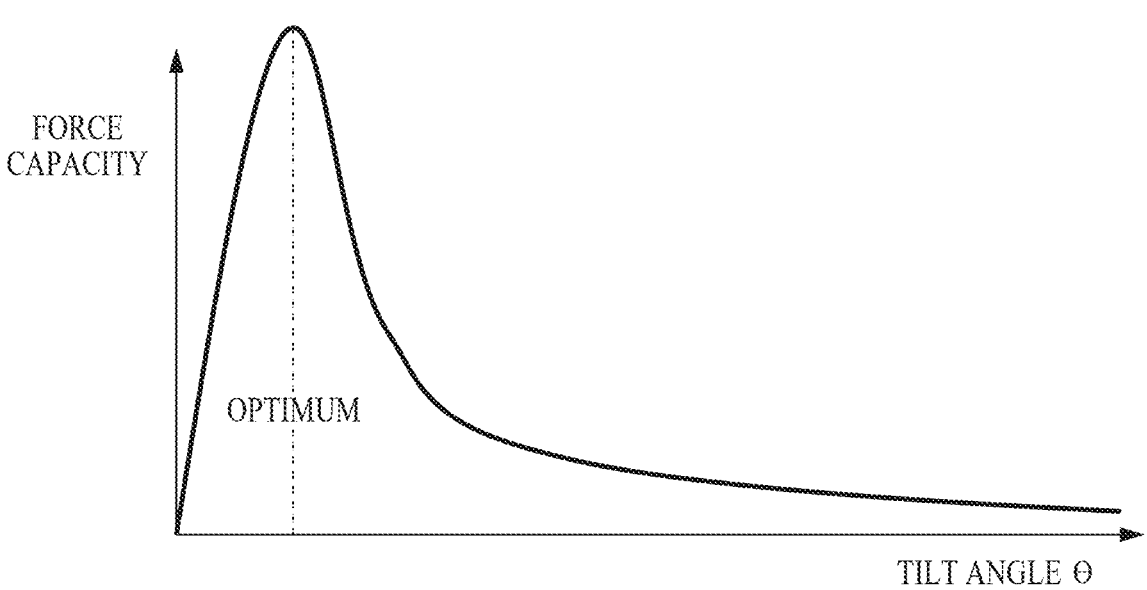
FIG. 34 is an exemplary graph of force capacity verses tilt angle, according to an embodiment.

Referring to FIGS. 33 and 34, the exact details of the edge feature 83 may be set to generate an optimum pressure. This may act to bias the pressure across the face of the pad 1 towards the edge feature 83. Consequently, the pad 1 may tilt, creating a pad wedge 32 between the pads 1 surface and the thrust runner 15 surface. The pad wedge 32, may at a certain pad tilt angle θ, balance the force across both sides of the pivot 6, and the pad 1 may therefore be in an equilibrium state in a tilted state. Consequently, with careful selection of the edge feature 83 and dimensions, the optimum tilt angle can be set that maximizes the pad force capacity.

The edge feature 83 may be designed to be symmetric about the pad 1 and symmetric across a gap between the pads 1. Thus, if the rotation of the thrust runner 15 is reversed, the wedge 32 may tilt in the opposite direction (e.g., the tilt angle θ will be reversed). In this manner, the design may be bi-directional. In other embodiments, where the design is not required to be bi-directional, the pads 1 may be designed with the pivot 6 offset circumferentially from the center of the pad 1.

Referring to FIGS. 14-18, in some embodiments, the mounting ring 2 is split into separate parts, e.g., with one mounting clip 10 per pad 1. In other embodiments, the mounting clips 10 may be designed to allow a multiple pads (e.g., two) per mounting clip 10. The mounting clip 10 may be formed using a punch tool or any other suitable manufacturing method. The mounting claim 10 may include spring elements 4 to secure the pads 1. Adjacent mounting clips 10 may be inserted into slots 3 of each pad 1. In other embodiments, the whole side of the mounting clip 10 can be used as the spring element. The height of the mounting clip 10 can be chosen so that the slots 3 in the pads 1 and mounting clip 10 align, with the pivot 6 and the bearing housing 8 in contact. In alternative embodiments, the height of the mounting clip 10 may be slightly reduced to increase the load applied by the spring element 4. In an alternative embodiment, the pivot 6 could be placed on the bearing housing 8 rather than the pads 1, or be a combination of both.

The outer diameter of the mounting clip 10 may include a retaining tang 11 which prevents radially outward translation of the pads 1. The retaining tangs 11 may be positioned on the outside as the pad 1 is assembled first before the mounting clip 10 is slid in from the side. However, the retaining tang 11 may be positioned elsewhere depending on the application. The close-fitting diameter may prevent inward sliding of the pad 1.

The mounting clip 10 may be designed with an opening 91 that is used to retain the mounting clip 10 by bolting it to the bearing housing 8. A bolt 13 may be put through the opening 91 and screwed into a hole 64 in the bearing housing. A set of bolts 13 may be assemble from the back face of the bearing housing 8 into a nut 14 on the mounting clip 10 that fits to the opening 91 (e.g., a nut receiving feature). The nut receiving feature 95 may be designed to prevent rotation of the nut 14 so the bolts 13 can be tightened. A square nut 14 is shown, however any form of nut 14 is within the scope of the present disclosure.

Referring to FIGS. 5-11, a thrust bearing 50 for an electric submersible pump may include a mounting ring 2 including spring elements 4, and pads 1 each including a fluid interface surface 55 and a pivot surface 56. Slots 3 may be formed between the pivot surface 56 and the fluid interface surface 55. The slots 3 may be radially oriented with respect to the mounting ring 2. The spring elements 4 may engage the slots 3 to secure the pads 1 to the mounting ring 2. The spring elements 4 may extend at an angle such that the spring elements 4 are press fit inside the pad slots 3. The thrust bearing 50 may further include a housing 8 comprising an axial surface 57 interfacing with the pivot surfaces 56, and an inner circumferential surface 45 radially constraining the pads 1. The housing 8 may surround the mounting ring 2. The housing 8 may be annular in shape.

In some embodiments, adjacent pairs of the spring elements 4 extend tangentially towards each other. The mounting ring may further include stops 94 respectively abutting the pads 1 (see FIG. 9). The stops 94 may be respectively disposed between the adjacent pairs of the spring elements 4. The mounting ring 2 may further include U-shaped structures 58. Each of the U-shaped structures 58 may include two of the spring elements 4 and one of the stops 94. The mounting ring 2 may further include stiffness tuning features 5. Each of the stiffness tuning features 5 may be disposed between an adjacent pair of the spring elements 4. That is, the stiffness tuning features may extend from a side of one U-shaped structure 58 to a side of another U-shaped structure 58. The stiffness tuning features 5 may each be disposed between adjacent pairs of the U-shaped structures 58. The stiffness tuning features may have a rectangular cross section.

There may be tangential spaces (e.g., a gap) between the pads 1. Oil may flow radially in the gap to recycle the oil. Each pad 1 of the pads 1 may be configured to independently tilt about the pivot 6 of the pad 1 in a radial direction. That is, the pad 1 may tilt such that the vector of rotation points radially with respect to the mounting ring 2. The fluid interface surfaces 55 may be configured such that a fluid film is formed between the fluid interface surfaces 55 and a thrust runner 15 (see FIG. 4) when there is relative motion between the fluid interface surfaces 55 and the thrust runner 15. As can be seen in FIG. 8, there may be a gap between an axial surface of the pads 1 and an axial surface of the mounting ring 2. The pivot surface 6 may be opposite to the fluid interface surface 55. The fluid interface surfaces 55 may share a common plane. The plane of the fluid interface surfaces 55 may be parallel to a plane common to the spring elements 4. The pads 1 may be equally spaced apart from each other and form a ring.

Referring to FIGS. 5-13, a method of assembling the thrust bearing 50 may include the steps of fastening the spring elements 4 to the slots 3; positioning the pads 1 such that the axial surface 57 interfaces with the pivot surfaces 56 and the housing 8 surrounds the mounting ring 2; positioning a first fixture 18A against another axial surface 59 of the housing 8; and bolting a second fixture 18B to the first fixture 18A. The first fixture 18A may be bolted to the second fixture 18B, for example, by a bolt through the center of both fixtures 18A,18B. The first fixture 18A may be cylindrical in shape. The second fixture 18B may include a cylindrical plate 60 and teeth 61 extending radially outward from the cylindrical plate 60. Each of the teeth 61 may be disposed between two adjacent pads 1 of the pads 1. Each of the pads 1 may abut an outer circumferential surface 62 of the cylindrical plate 60 while the first fixture 18A is affixed to the second fixture 18B. The method may further include the step of lapping the fluid interface surfaces 55; and removing the first fixture 18A and the second fixture 18B.

Referring to FIGS. 1-4, a method of assembling an electric submersible pump may include interfacing the thrust bearing 50 with a thrust runner 15 affixed to a shaft 53 connected to an electric motor 63 of an electric motor assembly 110; connecting the electric motor assembly 110 to a seal unit 112; and connecting the seal unit 112 to a centrifugal pump 116. A method of lifting fluid in a wellbore 102 may include running the electric submersible pump 106 into a wellbore 102; and providing electric power to the electric motor 63.

Referring to FIGS. 14-18, a thrust bearing 50 for an electric submersible pump may include mounting clips 10 including spring elements 4 and retaining tangs 11. The thrust bearing 50 may further include pads 1 each including a fluid interface surface 55 and a pivot surface 56. Slots 3 may be formed between the pivot surface 56 and the fluid interface surface 55. The spring elements 4 may engage the slots 3 to secure the pads 1 to the mounting clips 10. The thrust bearing 50 may further include a housing 8 comprising an axial surface 57 interfacing with the pivot surfaces 56. The mounting clips 10 may be affixed (e.g., bolted to) the housing 8. The retaining tangs 11 may radially constrain the pads 1 (e.g., prevent the pads 1 from translating radially outward).

In some embodiments, the spring elements 4 of each mounting clip 10 extend tangentially away from each other. In some embodiments, the spring elements 4 may hook radially inward. The retaining tangs 11 of each mounting clip 10 may extend tangentially away from each other (e.g., in an arc). The retaining tangs 11 may each be disposed along a virtual circle. Openings 12 may be respectively formed in the mounting clips 10. The opening 12 may be formed in nut receiving feature 95. The nut receiving feature 95 may be disposed on a plane that is axially spaced apart from a plane of the spring elements. Stepped portion(s) 96 may provide the nut receiving feature 95 with a different elevation than the spring elements 4 and the retaining tangs 11. Bolts 13 may extend through the openings 12 (e.g., a bore or an open or partial bore) and into holes 64 in the housing 8 to fasten the mounting clips 10 to the housing 8. In some embodiments, the spring elements 4 do not extend at an angle but are parallel with the other surfaces of the mounting clip 10. When the bolt 13 is tightened, stresses may appear in the spring elements 4 that result in a press fit of the spring element 4 inside the slots 3. A head 99 of the bolt 13 may abut a counterbore 98 formed in an axial surface 97 of the housing 8. The mounting clip 10 may abut the axial surface 57 of the housing 8, which is opposite to the axial surface 97.

There may be tangential spaces between the pads 1 (e.g., for allowing fluid to circulate). Each pad 1 of the pads 1 may be configured to independently tilt about the pivot surface 56 of the pad 1 in a radial direction. That is, a vector of the rotation of the pad 1 may point in a radial direction. The pivot surface 56 may comprise a radius or an edge about which the pad 1 may rotate.

Referring to FIGS. 12-18, a method of assembling the thrust bearing may include positioning the pads 1 such that the axial surface 57 interfaces with the pivot surfaces 56, inserting the spring elements 4 into the slots 3, and bolting the mounting clips 10 to the housing 8. The bolting of the mount clips 10 to the housing 8 may cause deformation of the mounting clips 10 that secures the spring elements 4 inside the slots 3. The method may further include positioning a first fixture 18A against another axial surface 59 of the housing 8, and bolting a second fixture 18B to the first fixture 18A. The second fixture 18B may include a cylindrical plate 60 and teeth 61 extending radially outward from the cylindrical plate 60. Each of the teeth 61 may be disposed between two adjacent pads 1 of the pads 1. Each of the pads 1 may abut an outer circumferential surface 62 of the cylindrical plate 60. The method may further include lapping the fluid interface surfaces 55 and removing the first fixture 18A and the second fixture 18B.

Referring to FIGS. 1-4, a method of assembling an electric submersible pump may include interfacing the thrust bearing 50 with a thrust runner 15 affixed to a shaft 53 connected to an electric motor 63 of an electric motor assembly 110; connecting the electric motor assembly 110 to a seal unit 112; and connecting the seal unit 112 to a centrifugal pump 116. A method of lifting fluid in a wellbore 102 may include running the electric submersible pump 106 into a wellbore 102; and providing electric power to the electric motor 63.

In some embodiments, a tilting pad design is provided which maximizes load capacity at high temperatures where the oil viscosity is low. The titling mechanism can be configured to allow operation of the bearing using a ball mounting approach. In some embodiments, a ceramic ball supports a thrust pad while allowing the thrust bearing pads to tilt. In some embodiments, a retention bolt and spring mounting system holds the pads in position on the ball while allowing the pads freedom to tilt.

Figure 19:
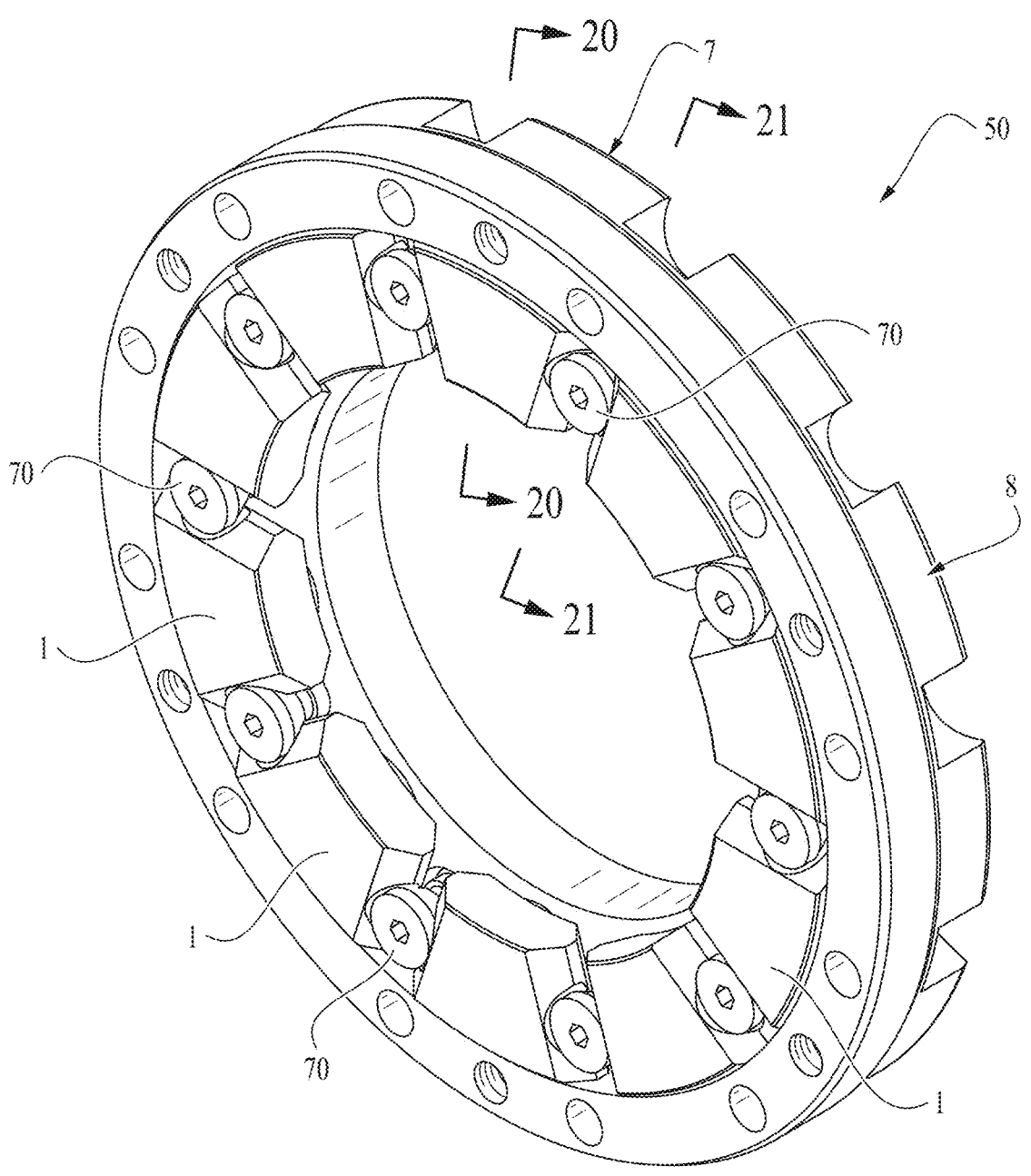
FIG. 19 is a perspective view of a pad assembly, according to yet another embodiment.

A ceramic tilting thrust pad may be mounted on a set of ceramic balls. FIG. 19 shows an exemplary design of a ball mounted pad assembly 7. A set of pads 1 may be located into a bearing housing 8. These pads 1 may then be retained to the bearing housing 8 using a set of retaining bolts 70. FIGS. 20-24 show a cross section through the ball mounting mechanism behind the pads 1. The center point of the ball 75 may be positioned so that the center of force on the pads 1 passes through it. However other locations may be selected depending on the required bearing operating characteristic.

In this embodiment, the ball 75 may be made of a ceramic, such as tungsten carbide, silicon nitride, alumina, zirconia or steel. The balls 75 may be of the type commonly used in roller bearing assemblies and may therefore be readily available and of extremely high accuracy in terms of size and sphericity.

The ball 75 may be mounted into a socket 72. In this embodiment, the socket 72 is shown as a separate component, however in alternative embodiments it could form part of the bearing housing 8. The socket 72 may be manufactured from a metallic material such as steel, brass or the like. In other embodiments, it could be made from ceramic or a polymer. The socket 72 may be designed such that it has a conical feature into which the ball 75 sits. The conical feature may be selected because it may fix all the translational degrees of freedoms of the ball 75, resulting in a fixed pivot point for the pads 1. In other embodiments, alternative socket geometries could be used instead of the conical feature to hold the ball 75 in a fixed position (e.g. a spherical ball socket).

The socket 72 may be designed to fit into a set of socket receiving bores 65 (e.g., counterbores) machined in the bearing housing 8. For ease of manufacture these are shown as circular, however in other embodiments, square or hexagonal shaped socket receiving holes/bores 65 may be used, with a corresponding shape on the outer diameter of the socket 72. In other embodiments the sides of the socket 72 may be threaded and fit in to a corresponding threaded hole in the bearing housing 8.

Figure 35:
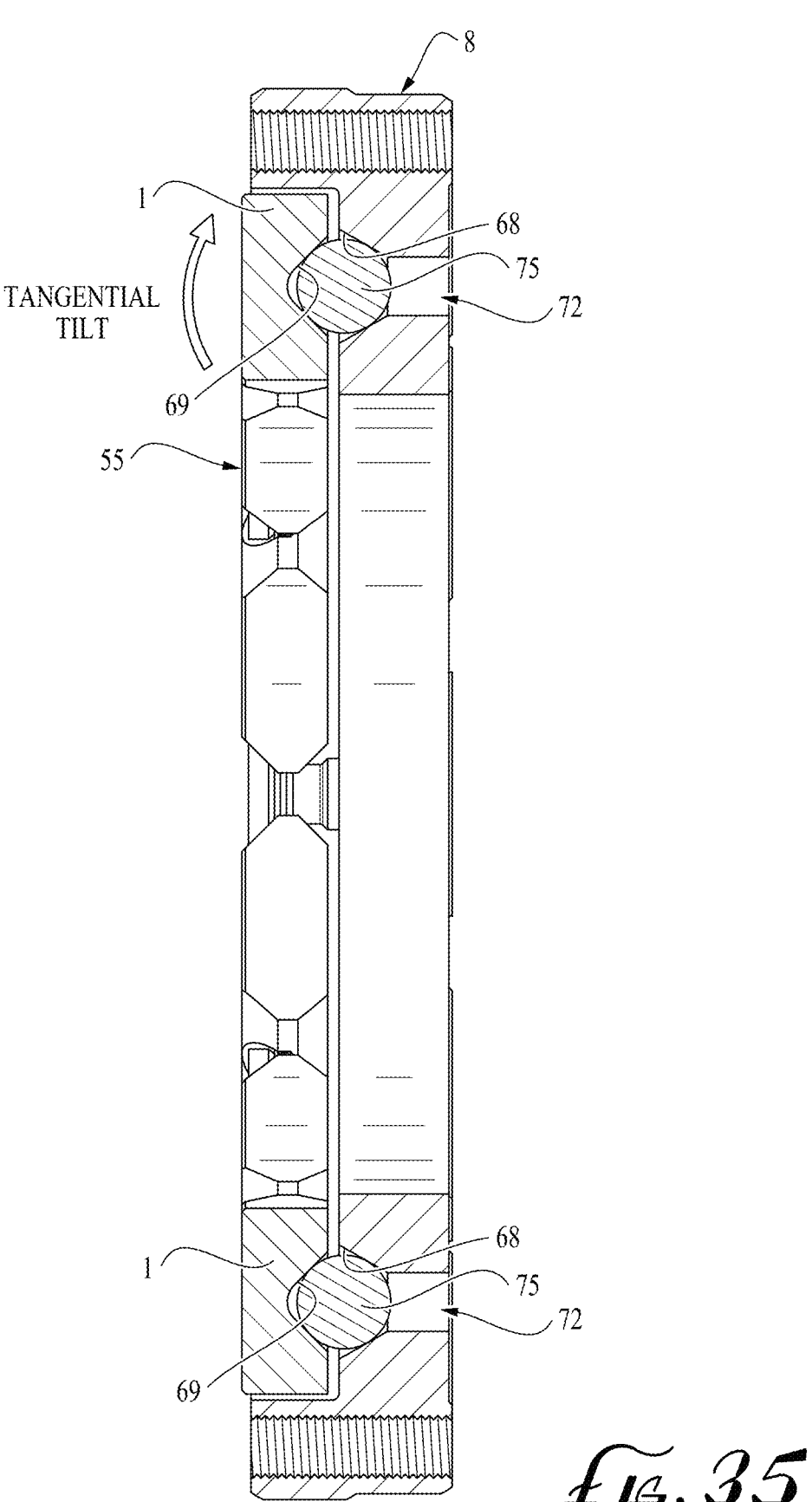
FIG. 35 is a is a side cross-sectional view of the thrust bearing, according to another embodiment.

Beneath the socket 72 and the base of the socket receiving holes/bores 65, a set of shims 44 may be used. These may be used to deal with the range of tolerances that can result in large variability in the position of the top of the pads 1 relative to the bearing housing 8. In other words, the shims 44 may be used to accurately position the top of the pads 1 to the same (or similar) height. Referring to FIG. 35, in some embodiments, for instance where the tolerance control is adequate, the shims 44 can be omitted. Similarly, in some embodiments where the shims are omitted, the socket 72 can become part of the bearing housing 8. That is, the sockets 72 can be integrally formed with the housing 8.

Similar to the socket 72, the underside of the pad 1 may also be designed to have a conical feature into which the ball 75 sits. The conical feature may be advantageous because it may fix all the translational degrees of freedoms of the ball 75, resulting in a fixed pivot point for the thrust pads 1. In other embodiments, alternative socket geometries could be used instead of the conical feature provided they perform the same function to hold the ball 75 in a fixed position. However, the conical feature may still allow the pad 1 to rotate in all directions, with the rotational axis in the radial direction being the primary tilt direction used to generate the thrust reaction force. A second rotational axis may lie in the tangential direction of the pads 1 allowing for side tilt. The side tilt may allow the thrust pad surface to adjust itself to be parallel to the thrust runner 15 in the radial direction. The pressure profile at the face of the pad 1 may have a center of force, and ball 75 may be positioned to give a balance. The force equilibrium may cause a tilt of the pad 1 in the radial direction. In the other direction, the force equilibrium may cause no tilt.

The cone angle of the conical feature may be selected according to the application. On the socket side, the cone may be of a shallow angle, while on the pads 1 the angle may be steeper. This may bias the sliding of the ball 75 towards the ceramic-on-ceramic interface present between the pads 1 and the ball 75, while limiting sliding on the metal-onceramic interface present between the socket 72 and the ball 75. This can be advantageous as for instance the ceramic-on-ceramic interface may be much more resistant to wear than the metal-on-ceramic interface. However, in some embodiments the bias is in the other direction, or no such bias in cone angle is used. The cone angle may also be selected to minimize stress, particularly on the ceramic pads 1, where a steeper angle may be used to reduce radial loading created by the axial force.

The thrust pads 1 may be held into the bearing housing 8 (e.g., using the retaining bolts 70). In FIG. 20, the retaining bolts 70 are shown as threading into the bearing housing 8, but other methods of mechanically retaining the retaining bolts 70 are within the scope of the present disclosure (e.g. nuts, circlips, welds, plates etc.). In this embodiment, a locking washer 29 is shown to prevent loosening of the retaining bolts 70, however in other embodiments, this may be omitted. The retaining bolts 70 may also locate within a partial/open counterbore 76 in the pads 1 (e.g., there may be one counterbore 76 on each side of the pad 1). Similarly, there may be two retaining bolts 70 per pad 1. The counterbore 76 may be required because the tops of the retaining bolts 70 may always need to be at a height below the tops of the pads 1.

To ensure that the pads 1 are able to tilt, a gap may be present between the retaining bolts 70 and the base of the open counterbore 76 in the pads 1. In some embodiments, this gap is filled using a biasing member 82 (e.g., a spring). This could be a low-profile coil spring, a wave washer style spring or in other embodiments a spring feature manufactured directly into the retaining bolts 70. The stiffness of the biasing member 82 can also be selected to provide a desired tilt stiffness to the pads 1. In other embodiments, the biasing member 82 can be omitted and a very close gap (e.g. 0.3 mm) may be used to enable the pads 1 to tilt whilst still limiting the movement of the pads 1 sufficiently that they can be considered secured to the bearing housing 8. In this embodiment, a lock washer 29 is used to prevent the retaining bolts 70 from coming loose with vibration. In other embodiments, equivalent features to prevent loosening of the retaining bolts 70 may be employed, e.g. adhesives, mechanical peening, residual-torque thread forms, etc.

Any number of thrust pads 1, ball 75, sockets 72, shims 44, retaining bolts 70, and biasing members 82 (e.g., located into the bearing housing 8 to form the thrust pad assembly 7) are within the scope of the present disclosure. The number of pads 1 may be chosen based on the available space for the bearing, manufacturing practicalities (e.g. to limit number of parts) and for optimizing load capacity.

Referring to FIGS. 19-29, the face of the thrust bearing 50 may be controlled such that all the fluid interface surface 55 of the pads 1 lie in the same plane and that this plane is flat and parallel to the thrust runner 15. This can be achieved by lapping the fluid interface surfaces 55. The pads 1 may be fixed in position to allow machining. This may be achieved by using fixture 79. The fixture 79 may directly fit to a side chamfer 77 on the pads 1 and replace the retaining bolts 70 for the lapping operation. Once lapping is complete the fixture 79 may be removed and the retaining bolts 70 may be reassembled.

The edge feature 83 may be a scallop, a chamfer, a fillet radius, or any other suitable form as shown in FIGS. 30-32. This may create an oil wedge leading into the pads 1 which may start to generate pressure as the oil is forced into the converging gap by the rotation of the thrust runner 15. The scallop 16 shown in FIG. 30 may have a length 22A and be manufactured by a large radius cutter with a small depth of cut. The chamfer 17 shown in FIG. 31 may have a length 22B with a small angle 23. The fillet radius 20 shown in FIG. 32 may have a large radius with a length 22C.

The exact details of the edge feature 83 may be set to generate an optimum pressure. This may act to bias the pressure across the face of the pad 1 towards the edge feature 83. Consequently, the pad 1 may tilt, creating a pad wedge 32 between the pads 1 surface and the thrust runner 15 surface. The pad wedge 32 may, at a certain pad tilt angle θ, balance the force across both sides of the pivot 6, and the pad 1 may therefore be in an equilibrium state in a tilted state. Consequently, the edge feature 83 and dimensions may be selected to achieve an optimum tilt angle that maximizes the pad force capacity.

The edge feature 83 may be designed to be symmetric about the pad 1 and symmetric across a gap between the pads 1. Thus, if the rotation of the thrust runner 15 is reversed, the wedge 32 may tilt in the opposite direction (e.g., the tilt angle θ will be reversed). In this manner, the design may be bi-directional. In other embodiments, where the design is not required to be bi-directional, the pads 1 may be designed with the pivot 6 offset circumferentially from the center of the pad 1.

Although the disclosure relates to ceramic pads, the design of the present disclosure can be used with other materials in lower temperature motors to enhance bearing performance.

Referring to FIGS. 19-25, a thrust bearing 50 for an electric submersible pump may include a housing 8 comprising an axial surface 57, and an inner circumferential surface 45. Holes 64 and bores (e.g., counterbores) 65 may be formed in the axial surface 57. The thrust bearing 50 may further include sockets 72 respectively disposed in the holes 64. The thrust bearing 50 may further include pads 1 each comprising a fluid interface surface 55. Two open counterbores 76 may be formed in each of the pads 1. The inner circumferential surface 45 may radially constrain the pads 1. The thrust bearing 50 may further include balls 75 each engaging one of the sockets 72 and one of the pads 1, and retaining bolts 70 each comprising a head 66 and a shaft 67 extending from the head 66. Each of the shafts 67 may be disposed in one of the bores 65. The thrust bearing 50 may further include biasing members 82 that are each disposed in a volume defined by one of the head 66 and two of the open counterbores 76. The biasing members 82 may be disposed between a bearing surface 48 of one of the heads 66 and bottom surfaces 49 of two of the counterbores 76.

The sockets 72 may each comprise an inner frustoconical surface 68. The inner frustoconical surface 68 may face away from the bearing housing. The inner frustoconical surface 68 may be centered in the socket 72 (e.g., centered on an axial face of the socket 72). The pads 1 may each comprise an inner conical surface 69. The conical surface 69 may be on an opposite side of the pad 1 from the fluid interface surface 55. The conical surface 69 may be centered on the pad 1 (e.g., centered on an axial face of the pad). Each of the balls 75 may engage one of the inner frustoconical surfaces 68 and one of the inner conical surfaces 69. The inner frustoconical surface 68 and the inner conical surface 69 may define a volume that at least partially encloses the ball 75. As used herein, the term "conical" may refer to either a conical or frustoconical surface.

Each of the pads 1 may be configured to tilt about the ball 75 or tilt with the ball 75 about the socket 72 in a radial direction (e.g., a vector of rotation of the pad 1 points in a radial direction in relation to the pad assembly). Each of the pads 1 may be further configured to tilt about the ball 75 or tilt with the ball 75 about the socket 72 in a tangential direction (e.g., a vector of rotation of the pad 1 points in a tangential direction in relation to the pad assembly). The ability of the pads 1 to tilt in the radial direction and the tangential direction or a combination of the two may allow the pads 1 to self-level and optimize load capacity. There may be clearance between the heads 66 of the retaining bolts 70.

and the partial counterbores 76 of the pads. Lock washers 29 may be disposed between the housing 8 and the heads 66 of the retaining bolts 70. Shims 44 may be disposed between the housing 8 and the sockets 72. In some embodiments, the retaining bolts 70 and the balls 75 form an alternating pattern around an interior of the bearing housing 8. The balls 75 may be disposed between adjacent retaining bolts 70. In some embodiments, the holes 64 and the bores 65 form an alternating pattern on the axial surface 57 of the bearing housing 8. The bores 65 may be disposed between adjacent holes 64. The bores 65 may have a larger diameter than the holes 64.

Each of the pads 1 may include a first chamfer 77 proximate one side of the pad 1 and a second chamfer 77 proximate another side of the pad 1. The open counterbores 76 may be formed in the first chamfer 77 and the second chamfer 77. The biasing members 82 may bias the pads 1 in an axial direction (e.g., axial in relation to the pad assembly 7). The sockets 72 may each include an aperture 78. The fluid interface surfaces 55 may be configured such that a fluid film is formed between the fluid interface surfaces 55 and a thrust runner 15 (see FIG. 4) when there is relative motion between the fluid interface surfaces 55 and the thrust runner 15.

A method of assembling the thrust bearing 50 may include placing the sockets 72 in the holes 64 (e.g., with shims between the sockets 72 and the hole 64 (e.g., to compensate for a tolerance deficiency of the pads 1)); placing the balls 75 on the sockets 72 (e.g., placing the balls 75 in contact with the inner frustoconical surfaces 68); placing the pads 1 on the balls 75 (e.g., placing the balls 75 in contact with the inner conical surface 69); and constraining the pads 1 from moving using fixtures 79 mounted between the pads 1. The fixtures 79 may be bolted to the housing 8 using mounting bolts 80 that extend into the bores 65. The method may further include lapping the fluid interface surfaces 55; removing the fixtures 79 from the pads 1; placing the biasing members 82 on the open counterbores 76 such that each of the biasing members 82 contacts two of the counterbores 76; and bolting the retaining bolts 70 to the housing 8. The shafts 67 may extend through the biasing members 82.

Referring to FIGS. 1-4, a method of assembling an electric submersible pump may include interfacing the thrust bearing 50 with a thrust runner 15 affixed to a shaft 53 connected to an electric motor 63 of an electric motor assembly 110; connecting the electric motor assembly 110 to a seal unit 112; and connecting the seal unit 112 to a centrifugal pump 116. A method of lifting fluid in a wellbore 102 may include running the electric submersible pump 106 into a wellbore 102; and providing electric power to the electric motor 63.

Figures 25, 26, 27:
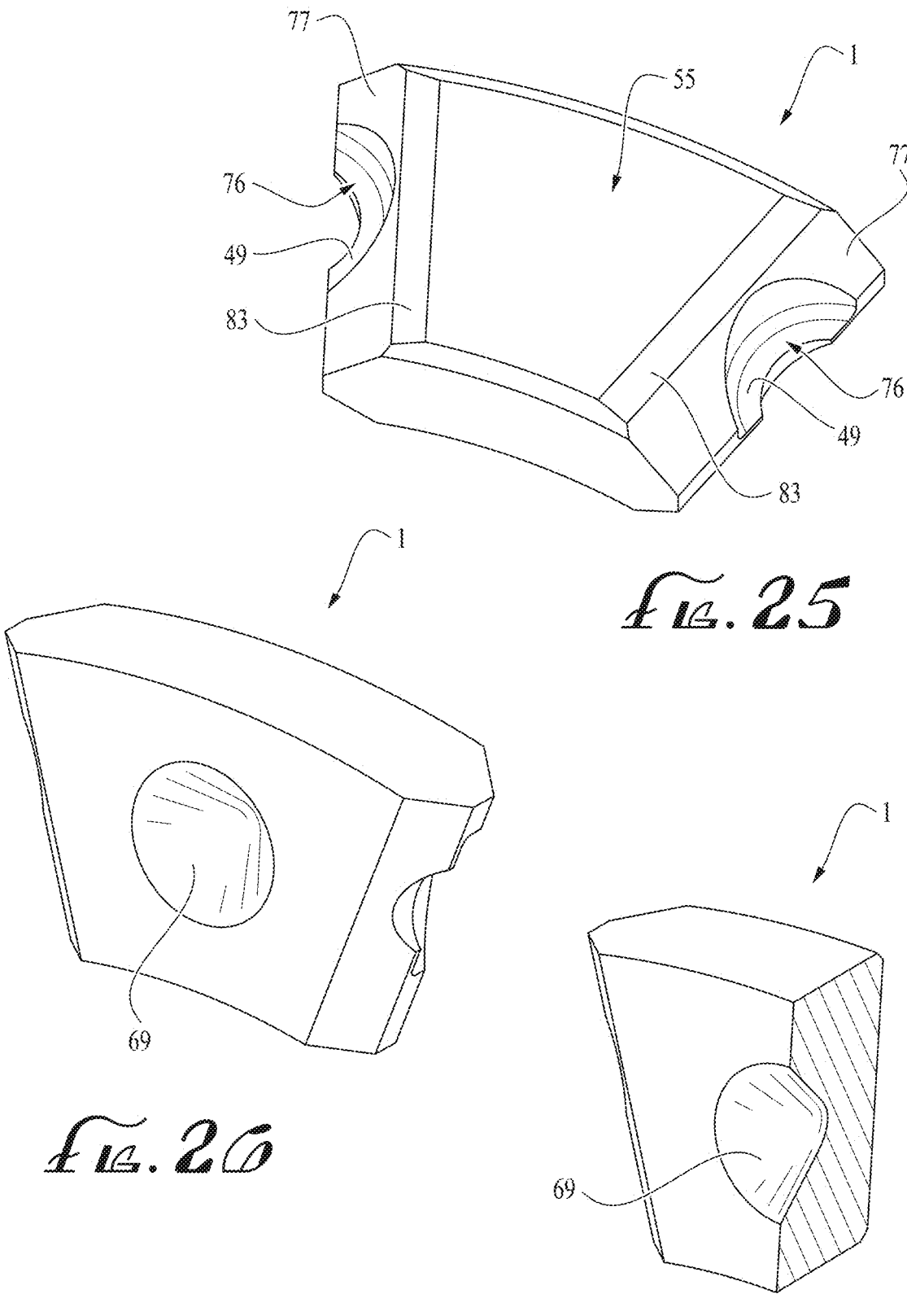
FIG. 25 is a perspective view of a pad of the pad assembly of FIG. 19.
FIG. 26 is another perspective view of the pad of the pad assembly of FIG. 19.
FIG. 27 is a perspective cross-sectional view of the pad of the pad assembly of FIG. 19.
Figure 28:
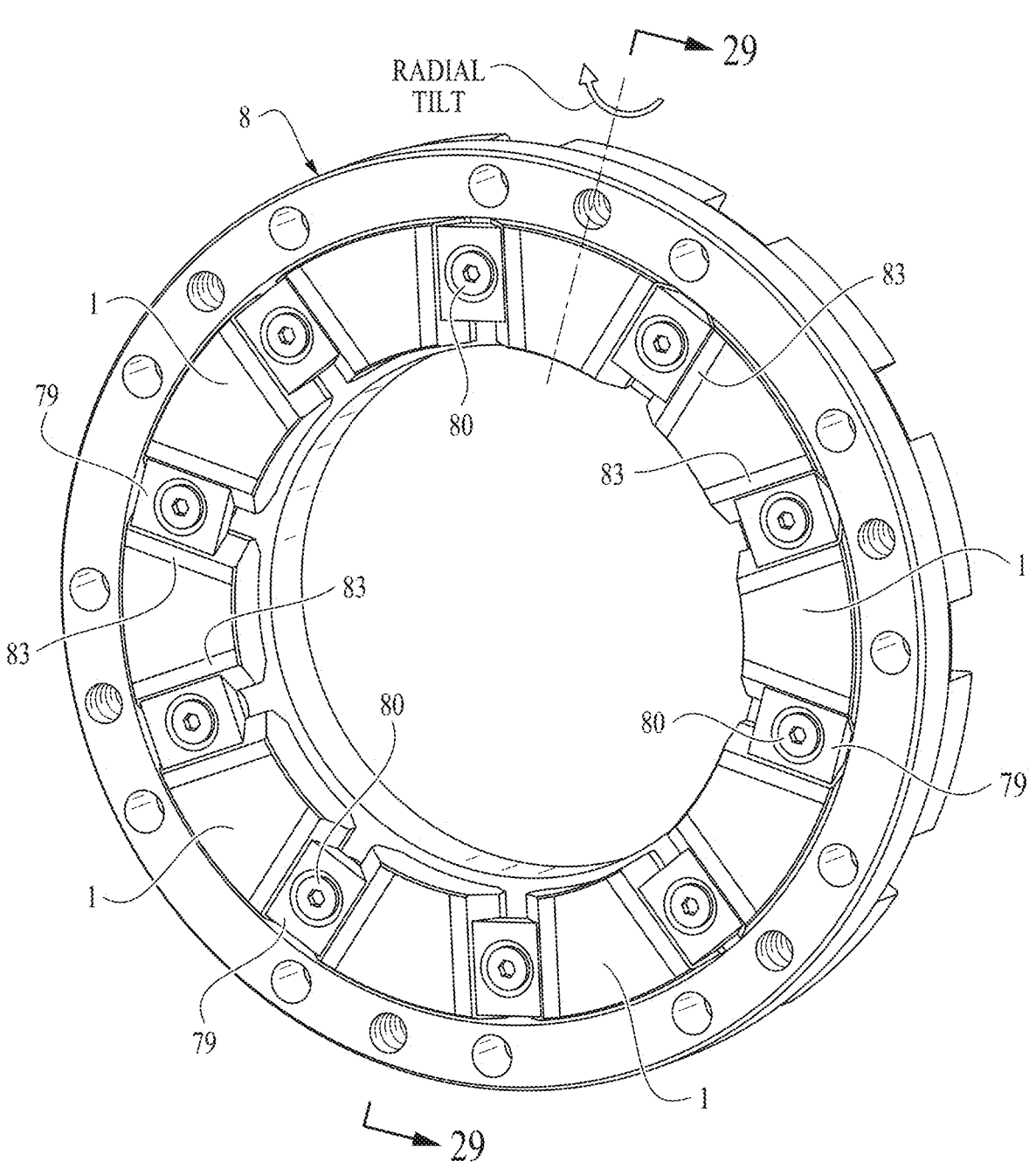
FIG. 28 is a perspective view of the thrust bearing and fixtures for lapping the pad assembly, according to another embodiment.
Figure 29:
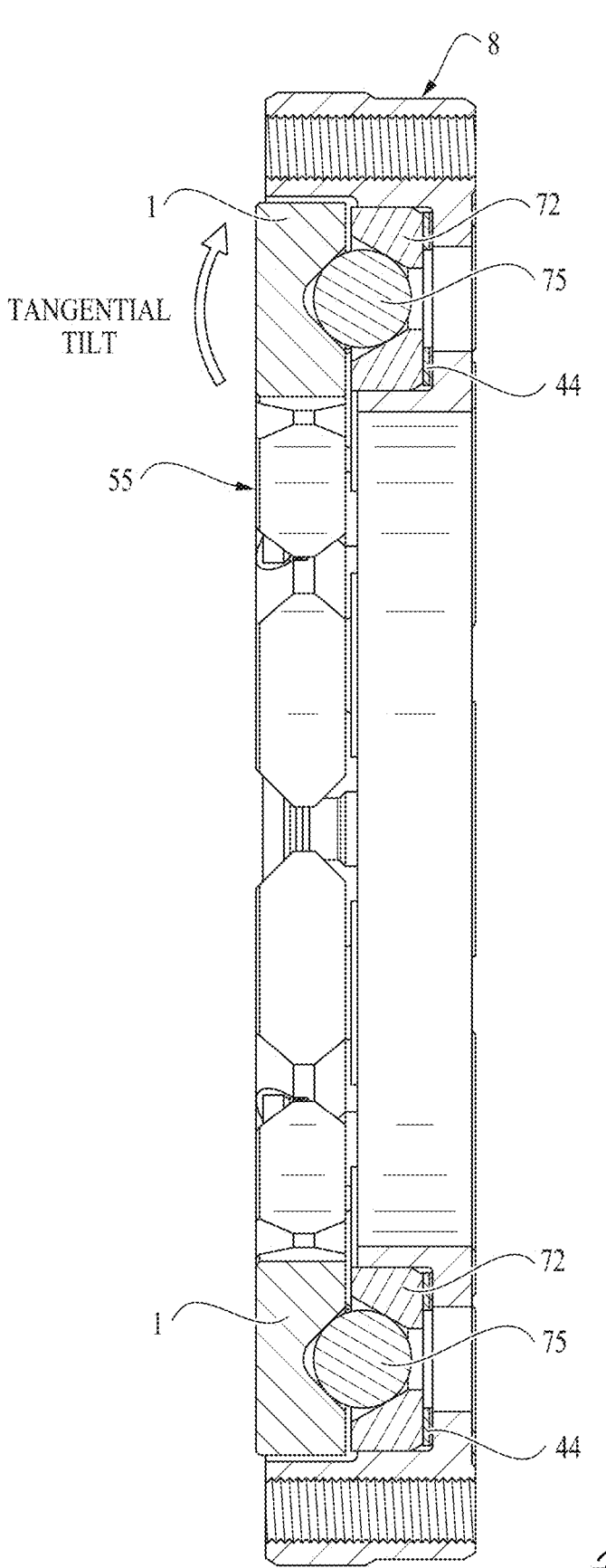
FIG. 29 is a side cross-sectional view of the thrust bearing and fixtures for lapping the pad assembly, according to the embodiment of FIG. 28.

Referring to FIG. 25, the fluid interface surface may include a first edge feature 83 disposed at a first end of the pad 1, a second edge feature 83 disposed at a second end of the pad 1, and a flat surface 84 extending from the first edge feature 83 to the second edge feature 83. Referring to FIG. 30, the first edge feature 83 and the second edge feature 83 may each comprise a concavely curved surface. For example, a profile defined by the concavely curved surfaces of adjacent pads 1 may be a circular segment. Referring to FIG. 31, the first edge feature 83 and the second edge feature 83 may each comprise a chamfer. Referring to FIG. 32, the first edge feature 83 and the second edge feature 83 may each comprise a convexly curved surface.

Referring to FIG. 33, when there is relative motion between thrust runner 15 and the pads 1, a fluid film is formed between the pad 1 and the thrust runner 15. The edge feature 83 may cause an initial force on the pad 1 that may cause the pad 1 to tilt at a tilt angle θ. The tilt angle θ may be maintained as the system reaches steady state (e.g., the rotor is at constant angular velocity). The tilt angle θ may influence flow of fluid over the flat surface 84 to cause a repulsive force between the thrust runner 15 and the pad 1. Referring to FIG. 34, parameters of the pad assembly 7 may be tuned such that during operation, the pad 1 tilts at a tilt angle θ that yields maximum force capacity (e.g., repulsive force between the thrust runner 15 and the pad 1). The viscosity of the oil, geometry of the pads, and/or rotational velocity may be taken into consideration to optimize the repulsive force. The amount of tilt could be, for example, 6-9 microns of travel at each end of the pad 1. In some embodiments, there may be a feature to stop the pads 1 from tilting beyond a critical angle.

The embodiments of the present disclosure may allow for the bearing to operate at higher temperatures as compared with the conventional art. The bearing may also have increased load capacity as compared with the conventional art. This may allow for lower viscosity oil grades to be used, which can improve system efficiency. The bearing of the present disclosure may also result in a more reliable bearing operation and/or better quality hydrodynamic film as compared with the prior art. Advantageously, the design may be inexpensive to manufacture.

ADDITIONAL DISCLOSURE

The following are non-limiting, specific embodiments in accordance with the present disclosure:

In a first embodiment, a thrust bearing for an electric submersible pump comprises a mounting ring comprising spring elements; pads each comprising a fluid interface surface and a pivot surface, wherein slots are formed between the pivot surface and the fluid interface surface, and wherein the spring elements engage the slots to secure the pads to the mounting ring; and a housing comprising an axial surface interfacing with the pivot surfaces, and an inner circumferential surface radially constraining the pads, wherein the housing surrounds the mounting ring.

A second embodiment can include the thrust bearing of the first embodiment, wherein adjacent pairs of the spring elements extend tangentially towards each other.

A third embodiment can include the thrust bearing of the first or second embodiments, wherein the mounting ring further comprises stops respectively abutting the pads, wherein the stops are respectively disposed between the adjacent pairs of the spring elements.

A fourth embodiment can include the thrust bearing of any of the first through third embodiments, wherein the mounting ring further comprises U-shaped structures, wherein each of the U-shaped structures comprises two of the spring elements and one of the stops.

A fifth embodiment can include the thrust bearing of any of the first through fourth embodiments, wherein the mounting ring further comprises stiffness tuning features, wherein each of the stiffness tuning features is disposed between an adjacent pair of the spring elements.

A sixth embodiment can include the thrust bearing of any of the first through fifth embodiments, wherein the tuning features are disposed between adjacent pairs of the U-shaped structures.

A seventh embodiment can include the thrust bearing of any of the first through sixth embodiments, wherein the fluid interface surface comprises a first edge feature disposed at a first end of the pad, a second edge feature disposed at a second end of the pad, and a flat surface extending from the first edge feature to the second edge feature.

An eighth embodiment can include the thrust bearing of any of the first through seventh embodiments, wherein the first edge feature and the second edge feature each comprise a concavely curved surface.

A ninth embodiment can include the thrust bearing of any of the first through eighth embodiments, wherein the first edge feature and the second edge feature each comprise a convexly curved surface.

A tenth embodiment can include the thrust bearing of any of the first through ninth embodiments, wherein the first edge feature and the second edge feature each comprise a chamfer.

An eleventh embodiment can include the thrust bearing of any of the first through tenth embodiments, wherein there are tangential spaces between the pads.

A twelfth embodiment can include the thrust bearing of any of the first through eleventh embodiments, wherein each pad of the pads is configured to independently tilt about the pivot surface of the pad in a radial direction.

A thirteenth embodiment can include the thrust bearing of any of the first through twelfth embodiments, wherein the fluid interface surfaces are configured such that a fluid film is formed between the fluid interface surfaces and a thrust runner when there is relative motion between the fluid interface surfaces and the thrust runner.

In a fourteenth embodiment, a method of assembling the thrust bearing of any of the first through thirteenth embodiments comprises fastening the spring elements to the slots; positioning the pads such that the axial surface interfaces with the pivot surfaces and the housing surrounds the mounting ring; positioning a first fixture against another axial surface of the housing; bolting a second fixture to the first fixture to retain the pads, wherein the second fixture comprises a cylindrical plate and teeth extending radially outward from the cylindrical plate, wherein each of the teeth is disposed between two adjacent pads of the pads, and wherein each of the pads abuts an outer circumferential surface of the cylindrical plate; lapping the fluid interface surfaces; and removing the first fixture and the second fixture. In some embodiments, these steps are performed in the order presented.

In a fifteenth embodiment, a method of assembling an electric submersible pump comprises interfacing the thrust bearing of any of the first through fourteenth embodiments with a thrust runner affixed to a shaft connected to an electric motor of an electric motor assembly; connecting the electric motor assembly to a seal unit; and connecting the seal unit to a centrifugal pump.

In a sixteenth embodiment, a method of lifting fluid in a wellbore comprises running the electric submersible pump of the fifteenth embodiment into a wellbore (e.g. placing the ESP downhole); and providing electric power to the electric motor (e.g., operating the ESP to pump fluid to the surface).

In a seventeenth embodiment, a thrust bearing for an electric submersible pump comprises mounting clips comprising spring elements and retaining tangs; pads each comprising a fluid interface surface and a pivot surface, wherein slots are formed between the pivot surface and the fluid interface surface, and wherein the spring elements engage the slots to secure the pads to the mounting clips; and a housing comprising an axial surface interfacing with the pivot surfaces, wherein the mounting clips are affixed to the housing, and wherein the retaining tangs radially constrain the pads.

An eighteenth embodiment can include the thrust bearing of the seventeenth embodiment, wherein the spring elements of each mounting clip extend tangentially away from each other.

A nineteenth embodiment can include the thrust bearing of the seventeenth or eighteenth embodiments, wherein the retaining tangs of each mounting clip extend tangentially away from each other.

A twentieth embodiment can include the thrust bearing of any of the seventeenth through nineteenth embodiments, wherein openings are respectively formed in the mounting clips, and wherein bolts extends through the openings and into holes in the housing to fasten the mounting clips to the housing.

A twenty-first embodiment can include the thrust bearing of any of the seventeenth through twentieth embodiments, wherein the fluid interface surface comprises a first edge feature disposed at a first end of the pad, a second edge feature disposed at a second end of the pad, and a flat surface extending from the first edge feature to the second edge feature.

A twenty-second embodiment can include the thrust bearing of any of the seventeenth through twenty-first embodiments, wherein the first edge feature and the second edge feature each comprise a concavely curved surface.

A twenty-third embodiment can include the thrust bearing of any of the seventeenth through twenty-second embodiments, wherein the first edge feature and the second edge feature each comprise a convexly curved surface.

A twenty-fourth embodiment can include a thrust bearing of any of the seventeenth through twenty-third embodiments, wherein the first edge feature and the second edge feature each comprise a chamfer.

A twenty-fifth embodiment can include the thrust bearing of any of the seventeenth through twenty-fourth embodiments, wherein there are tangential spaces between the pads.

A twenty-sixth embodiment can include the thrust bearing of any of the seventeenth through twenty-fifth embodiments, wherein each pad of the pads is configured to independently tilt about the pivot surface in a radial direction.

A twenty-seventh embodiment can include the thrust bearing of any of the seventeenth through twenty-sixth embodiments, wherein the fluid interface surfaces are configured such that a fluid film is formed between the fluid interface surfaces and a thrust runner when there is relative motion between the fluid interface surfaces and the thrust runner.

In a twenty-eighth embodiment, a method of assembling the thrust bearing of any of the seventeenth through twenty-seventh embodiments comprises positioning the pads such that the axial surface interfaces with the pivot surfaces; inserting the spring elements into the slots (e.g., after the positioning); fastening the mounting clips to the housing, wherein the bolting of the mount clips to the housing causes deformation of the mounting clips that secures the spring elements inside the slots; positioning a first fixture against another axial surface of the housing; bolting a second fixture to the first fixture, wherein the second fixture comprises a cylindrical plate and teeth extending radially outward from the cylindrical plate, wherein each of the teeth is disposed between two adjacent pads of the pads, and wherein each of the pads abuts an outer circumferential surface of the cylindrical plate; lapping the fluid interface surfaces; and removing the first fixture and the second fixture. In some embodiments, these steps are performed in the order presented.

In a twenty-ninth embodiment, a method of assembling an electric submersible pump comprises interfacing the thrust bearing of any of the first through fourteenth embodiments with a thrust runner affixed to a shaft connected to an electric motor of an electric motor assembly; connecting the electric motor assembly to a seal unit; and connecting the seal unit to a centrifugal pump.

In a thirtieth embodiment, a method of lifting fluid in a wellbore comprises running the electric submersible pump of the twenty-ninth embodiment into a wellbore (e.g., placing the ESP downhole); and providing electric power to the electric motor (e.g., operating the ESP to pump fluid to the surface).

In a thirty-first embodiment, a thrust bearing for an electric submersible pump comprises a housing comprising an axial surface and an inner circumferential surface, wherein holes and bores are formed in the axial surface; sockets respectively disposed in the holes; pads each comprising a fluid interface surface, wherein two open counterbores are formed in each of the pads, and wherein the inner circumferential surface radially constrains the pads; balls each engaging one of the sockets and one of the pads; retaining bolts each comprising a head and a shaft extending from the head, wherein each of the shafts is disposed in one of the bores, and biasing members each disposed in a volume defined by one of the heads and two of the open counterbores.

A thirty-second embodiment can include the thrust bearing of the thirty-first embodiment, wherein the sockets each comprise a first inner frustoconical surface, the pads each comprise a second inner frustoconical surface, and each of the balls engages one of the first inner frustoconical surfaces and one of the second inner frustoconical surfaces.

A thirty-third embodiment can include the thrust bearing of the thirty-first or thirty-second embodiments, wherein each of the pads is configured to tilt about the ball or tilt with the ball about the socket in a radial direction.

A thirty-fourth embodiment can include the thrust bearing of any of the thirty-first through thirty-third embodiments, wherein each of the pads is further configured to tilt about the ball or tilt with the ball about the socket in a tangential direction.

A thirty-fifth embodiment can include the thrust bearing of any of the thirty-first through thirty-fourth embodiments, wherein there is clearance between the heads and the pads.

A thirty-sixth embodiment can include the thrust bearing of any of the thirty-first through thirty-fifth embodiments, further comprising lock washers disposed between the housing and the retaining bolts.

A thirty-seventh embodiment can include the thrust bearing of any of the thirty-first through thirty-sixth embodiments, further comprising shims disposed between the housing and the sockets, wherein the shims are configured to set positions of the faces of the pads.

A thirty-eighth embodiment can include the thrust bearing of any of the thirty-first through thirty-seventh embodiments, wherein the fluid interface surface comprises a first edge feature disposed at a first end of the pad, a second edge feature disposed at a second end of the pad, and a flat surface extending from the first edge feature to the second edge feature.

A thirty-ninth embodiment can include the thrust bearing of any of the thirty-first through thirty-eighth embodiments, wherein the first edge feature and the second edge feature each comprise a concavely curved surface.

A fortieth embodiment can include the thrust bearing of any of the thirty-first through thirty-ninth embodiments, wherein the first edge feature and the second edge feature each comprise a convexly curved surface.

A forty-first embodiment can include the thrust bearing of any of the thirty-first through fortieth embodiments, wherein the first edge feature and the second edge feature each comprise a chamfer.

A forty-second embodiment can include the thrust bearing of any of the thirty-first through forty-first embodiments, wherein there are tangential spaces between the pads.

A forty-third embodiment can include the thrust bearing of any of the thirty-first through forty-second embodiments, wherein the fluid interface surfaces are configured such that a fluid film is formed between the fluid interface surfaces and a thrust runner when there is relative motion between the fluid interface surfaces and the thrust runner.

A forty-fourth embodiment can include the thrust bearing of any of the thirty-first through forty-third embodiments, wherein there are tangential spaces between the pads.

A forty-fifth embodiment can include the thrust bearing of any of the thirty-first through forty-fourth embodiments, wherein each of the pads comprises a first chamfer proximate the first edge feature and a second chamfer proximate the second edge feature.

A forty-sixth embodiment can include the thrust bearing of any of the thirty-first through forty-fifth embodiments, wherein the open counterbores are formed in the first chamfers and the second chamfers.

A forty-seventh embodiment can include the thrust bearing of any of the thirty-first through forty-sixth embodiments, wherein the biasing members bias the pads in an axial direction.

In a forty-eighth embodiment, a method of assembling the thrust bearing of any of the thirty-first through forty-seventh embodiments comprises placing the sockets in the holes; placing the balls on the sockets; placing the pads on the balls; constraining the pads from moving using fixtures mounted between the pads, wherein the fixtures are bolted to the housing using mounting bolts that extend into the bores; lapping the fluid interface surfaces; removing the fixtures from the pads; placing the biasing members on the open counterbores such that each of the biasing members contacts two of the counterbores; and bolting the retaining bolts to the housing, wherein the shafts extend through the biasing members and are disposed in the volume. In some embodiments, these steps are performed in the order presented.

In a forty-ninth embodiment, a method of assembling an electric submersible pump comprises interfacing the thrust bearing of any of the first through fourteenth embodiments with a thrust runner affixed to a shaft connected to an electric motor of an electric motor assembly; connecting the electric motor assembly to a seal unit; and connecting the seal unit to a centrifugal pump.

In a fiftieth embodiment, a method of lifting fluid in a wellbore comprises running the electric submersible pump of the forty-ninth embodiment into a wellbore (e.g., placing the ESP downhole); and providing electric power to the electric motor (e.g., operating the ESP to pump fluid to the surface).

In a fifty-first embodiment, a thrust bearing for an electric submersible pump comprises a housing comprising an axial surface, an inner circumferential surface, and first conical surfaces, wherein bores are formed in the axial surface; pads each comprising fluid interface surfaces and second conical surfaces, wherein two open counterbores are formed in each of the pads, and wherein the inner circumferential surface radially constrains the pads; balls each engaging one of the first conical surfaces and one of the second conical surfaces; and retaining bolts extending through the bores and configured to retain the pads.

A fifty-second embodiment can include the thrust bearing of the fifty-first embodiment, further comprising biasing members, wherein the retaining bolts each comprise a head and a shaft extending from the head, wherein each of the shafts is disposed in one of the bores, and wherein the biasing members are each disposed between a bearing surface of one of the heads and bottom surfaces of two of the open counterbores.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations. For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity.

Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. Any discussion of a reference herein is not an admission that it is prior art. Any disclosures of all patents, patent applications, and/or publications cited herein are hereby incorporated by reference, to the extent that they provide exemplary, procedural, or other details supplementary to those set forth herein.

As used herein, the term "or" does not require selection of only one element. Thus, the phrase "A or B" is satisfied by either one or both elements from the set {A, B}. A clause that recites "A or B" can be infringed with only one of the listed items, both of the listed items, multiples of the listed items, and one or both of the listed items and another item not listed. The phrase "A, B, or C" is satisfied by any one or any combination of any two or more from the set {A, B, C}. A clause that recites "A, B, or C" can be infringed with only one of the listed items, multiples of the listed items, and one or more of the items from the list and another item not listed.

As used herein, the article "a" means "one or more." As used herein, the article "an" means "one or more." As used herein, the article "the" when referring to a singular noun means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A thrust bearing for an electric submersible pump, comprising:

a housing comprising an axial surface and an inner circumferential surface, wherein holes and bores are formed in the axial surface;

sockets respectively disposed in the holes;

pads each comprising a fluid interface surface, wherein two open counterbores are formed in each of the pads, and wherein the inner circumferential surface radially constrains the pads;

balls each engaging one of the sockets and one of the pads;

retaining bolts each comprising a head and a shaft extending from the head, wherein each of the shafts is disposed in one of the bores; and biasing members each disposed between a bearing surface of one of the heads and bottom surfaces of two of the open counterbores.

2. The thrust bearing of claim 1, wherein the sockets each comprise an inner frustoconical surface, the pads each comprise an inner conical surface, and each of the balls engages one of the inner frustoconical surfaces and one of the inner conical surfaces.

3. The thrust bearing of claim 1, wherein each of the pads is configured to tilt about the ball in a radial direction.

4. The thrust bearing of claim 1, wherein each of the pads is configured to tilt about the ball in a tangential direction.

5. The thrust bearing of claim 1, wherein there is clearance between the heads and the pads.

6. The thrust bearing of claim 1, further comprising lock washers disposed between the housing and the retaining bolts.

7. The thrust bearing of claim 1, further comprising shims disposed between the housing and the sockets, wherein the shims are configured to set positions of the faces of the pads.

8. The thrust bearing of claim 1, wherein the fluid interface surface comprises a first edge feature disposed at a first end of the pad, a second edge feature disposed at a second end of the pad, and a flat surface extending from the first edge feature to the second edge feature.

9. The thrust bearing of claim 8, wherein the first edge feature and the second edge feature each comprise a concavely curved surface.

10. The thrust bearing of claim 8, wherein the first edge feature and the second edge feature each comprise a convexly curved surface.

11. The thrust bearing of claim 8, wherein the first edge feature and the second edge feature each comprise a chamfer.

12. The thrust bearing of claim 8, wherein each of the pads comprises a first chamfer proximate the first edge feature and a second chamfer proximate the second edge feature, and the open counterbores are formed in the first chamfers and the second chamfers.

13. The thrust bearing of claim 1, wherein there are spaces between the pads.

14. The thrust bearing of claim 1, wherein the biasing members bias the pads in an axial direction.

15. The thrust bearing of claim 1, wherein the fluid interface surfaces are configured such that a fluid film is formed between the fluid interface surfaces and a thrust runner when there is relative motion between the fluid interface surfaces and the thrust runner.

16. The thrust bearing of claim 1, wherein each of the pads is configured to tilt with the ball about the socket in a radial direction.

17. The thrust bearing of claim 1, wherein each of the pads is configured to tilt with the ball about the socket in a tangential direction.

18. A method of assembling the thrust bearing of claim 1, comprising:

placing the sockets in the holes;

placing the balls on the sockets;

placing the pads on the balls;

constraining the pads from moving using fixtures mounted between the pads, wherein the fixtures are bolted to the housing using mounting bolts that extend into the bores;

lapping the fluid interface surfaces;

removing the fixtures from the pads;

placing the biasing members on the bottom surfaces of the open counterbores such that each of the biasing members contacts two of the bottom surfaces; and bolting the retaining bolts to the housing, wherein the shafts extend through the biasing members.

19. A method of assembling an electric submersible pump, comprising:

interfacing the thrust bearing of claim 1 with a thrust runner affixed to a shaft connected to an electric motor of an electric motor assembly;

connecting the electric motor assembly to a seal unit; and connecting the seal unit to a centrifugal pump.

20. A method of lifting fluid in a wellbore, comprising:

running the electric submersible pump assembled by the method of claim 19 into a wellbore; and providing electric power to the electric motor.

21. A thrust bearing for an electric submersible pump, comprising:

a housing comprising an axial surface, an inner circumferential surface, and first conical surfaces, wherein bores are formed in the axial surface;

pads each comprising fluid interface surfaces and second conical surfaces, wherein two open counterbores are formed in each of the pads, and wherein the inner circumferential surface radially constrains the pads;

balls each engaging one of the first conical surfaces and one of the second conical surfaces; and retaining bolts extending through the bores and the open counterbores to retain the pads.

22. The thrust bearing of claim 21, further comprising biasing members, wherein the retaining bolts each comprise a head and a shaft extending from the head, wherein each of the shafts is disposed in one of the bores, and wherein the biasing members are each disposed between a bearing surface of one of the heads and bottom surfaces of two of the open counterbores.

23. A thrust bearing for an electric submersible pump, comprising:

a housing comprising an axial surface and an inner circumferential surface, wherein holes and bores are formed in the axial surface;

sockets comprising first conical surfaces, wherein the sockets are disposed in the holes;

pads each comprising fluid interface surfaces and second conical surfaces, wherein two open counterbores are formed in each of the pads, and wherein the inner circumferential surface radially constrains the pads;

balls each engaging one of the first conical surfaces and one of the second conical surfaces; and retaining bolts extending through the bores and the open counterbores to retain the pads.

24. The thrust bearing of claim 23, further comprising biasing members, wherein the retaining bolts each comprise a head and a shaft extending from the head, wherein each of the shafts is disposed in one of the bores, and wherein the biasing members are each disposed between a bearing surface of one of the heads and bottom surfaces of two of the open counterbores.

* * * * *